United States Patent [19]
Matsumoto

[11] Patent Number: 5,645,911
[45] Date of Patent: *Jul. 8, 1997

[54] OVER-WRITABLE METHOD OF MAGNETOOPTICAL RECORDING

[75] Inventor: Hiroyuki Matsumoto, Tokyo, Japan

[73] Assignee: Nikon Corporation, Tokyo, Japan

[*] Notice: The term of this patent shall not extend beyond the expiration date of Pat. No. 5,239,534.

[21] Appl. No.: 434,119

[22] Filed: May 2, 1995

Related U.S. Application Data

[60] Continuation of Ser. No. 736,649, Jul. 26, 1991, abandoned, which is a division of Ser. No. 581,199, Sep. 10, 1990, abandoned, which is a continuation of Ser. No. 368,849, Jun. 20, 1989, abandoned.

[30] Foreign Application Priority Data

Jun. 24, 1988 [JP] Japan ..................... 63-156552

[51] Int. Cl.[6] ........................................ G11B 5/66
[52] U.S. Cl. .................. 428/64.3; 428/694 ML; 428/694 SC; 428/694 MT; 428/694 RE; 428/694 MM; 428/694 EC; 428/900; 369/13; 365/122; 430/945
[58] Field of Search ............... 428/694 ML, 694 SC, 428/694 MT, 694 RE, 694 MM, 694 EC, 900, 64.3; 369/13; 365/122; 430/945

[56] References Cited

U.S. PATENT DOCUMENTS 4,649,519  3/1987  Sun et al. ..................... 365/122
4,855,975  8/1989  Akasaka et al. ............... 369/13
5,239,534  8/1993  Matsumoto ..................... 369/288
5,248,565  9/1993  Tsutsumi et al. ............... 428/694 FC

FOREIGN PATENT DOCUMENTS 8775306    1/1988   Australia .
62-175948  of 1987  Japan .
1-277349   of 1989  Japan .

OTHER PUBLICATIONS

R. G. Swartz et al, *The Bell System Technical Journal*, Stabilized Biasing of Semiconductor Lasers, Sep. 1983, vol. 62, pp. 1923–1936.

*Primary Examiner*—Leszek Kiliman
*Attorney, Agent, or Firm*—Shapiro and Shapiro

[57] ABSTRACT

An over-writable method of magnetooptical recording using a magnetooptical recording medium provides a high C/N ratio in a reproduction mode, permits reduction of the intensity of the initial magnetic field at room temperature in a recording mode, and permits reduction of laser beam intensity in a recording mode. First and second magnetic layers having perpendicular magnetic anisotropy serve as a recording layer and as a reference layer, respectively. The second layer comprises an alloy composition given by the formula:

$$(Tb_U Dy_{100-U})_V (Fe_{100-W} Co_W)_{100-V}$$

where U=0 to 50 atomic %
V=15 to 35 atomic % and
W=1 to 50 atomic %.
The medium satisfies certain required conditions.

4 Claims, 14 Drawing Sheets

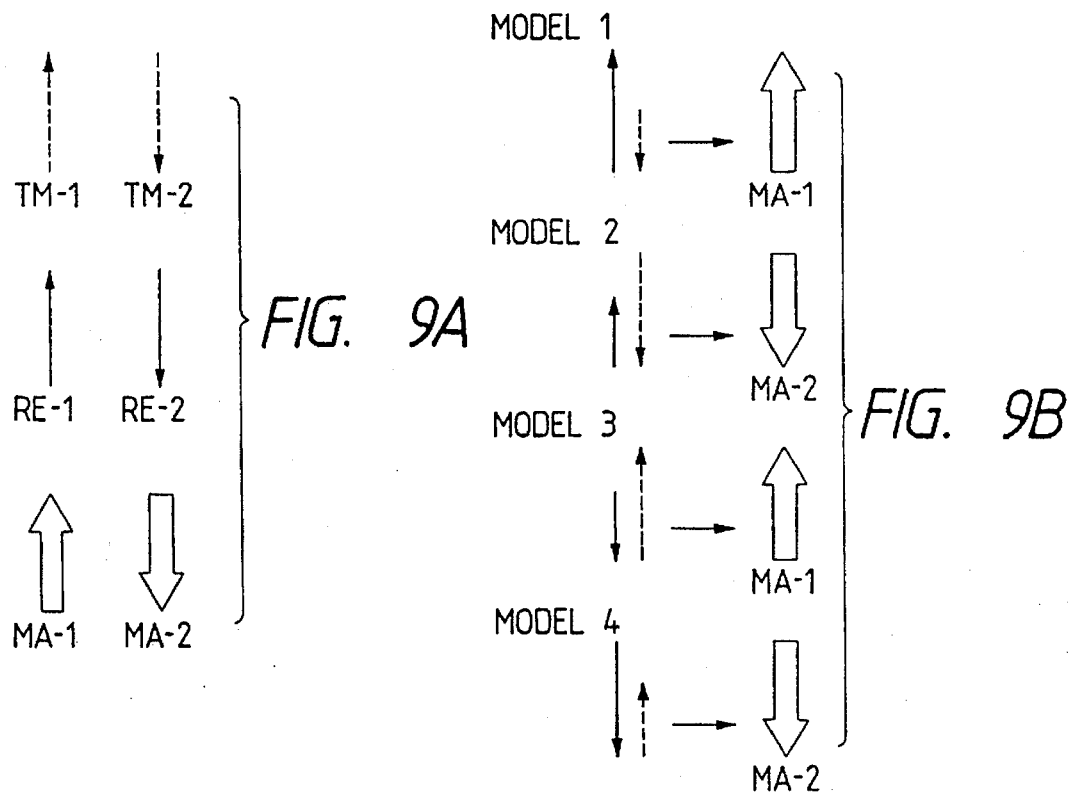
FIG. 9A
FIG. 9B
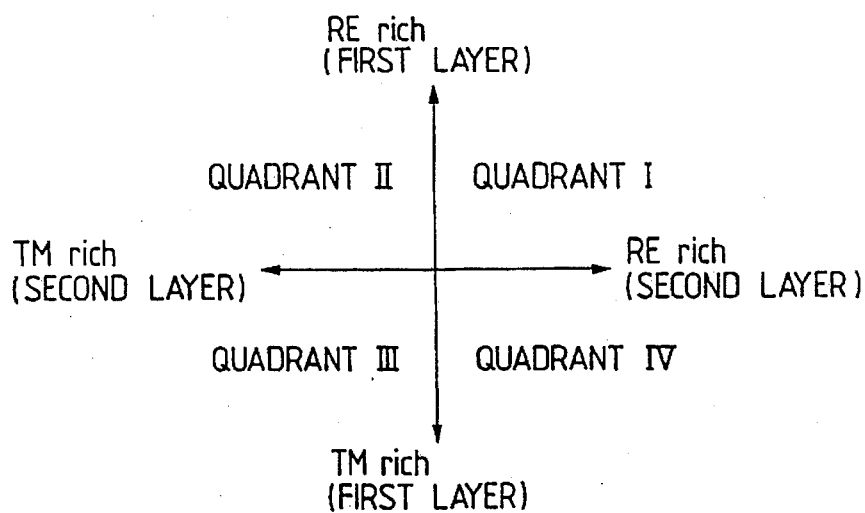
FIG. 10

MEDIUM NO. 1

MEDIUM NO. 4

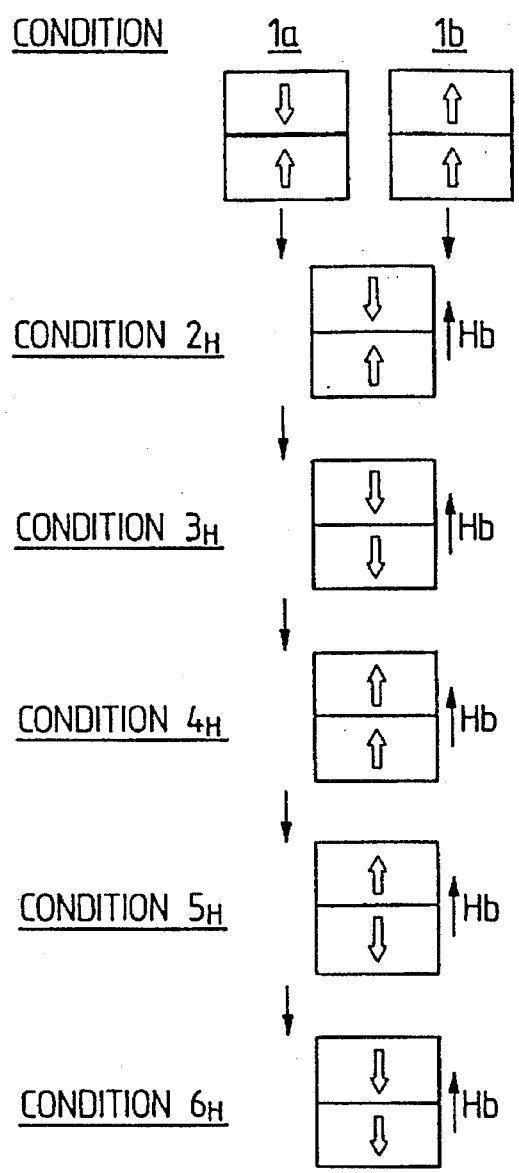
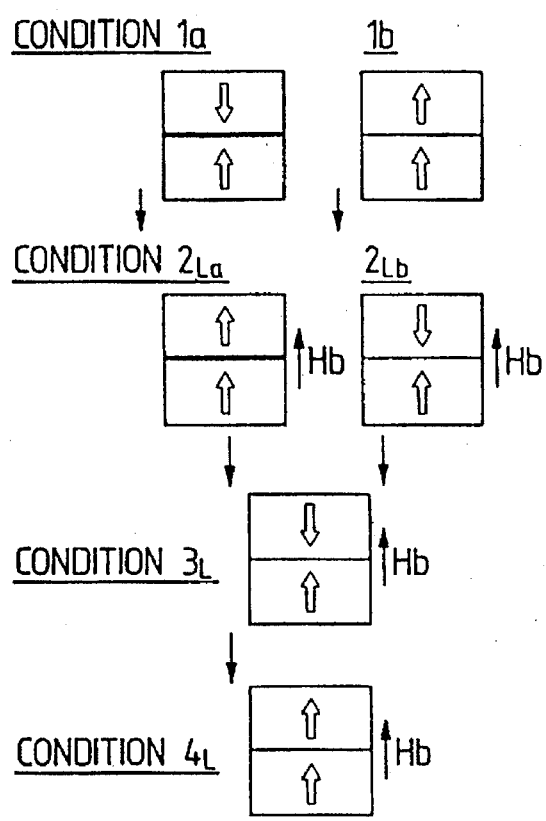
FIG. 13
FIG. 14

FIG. 16
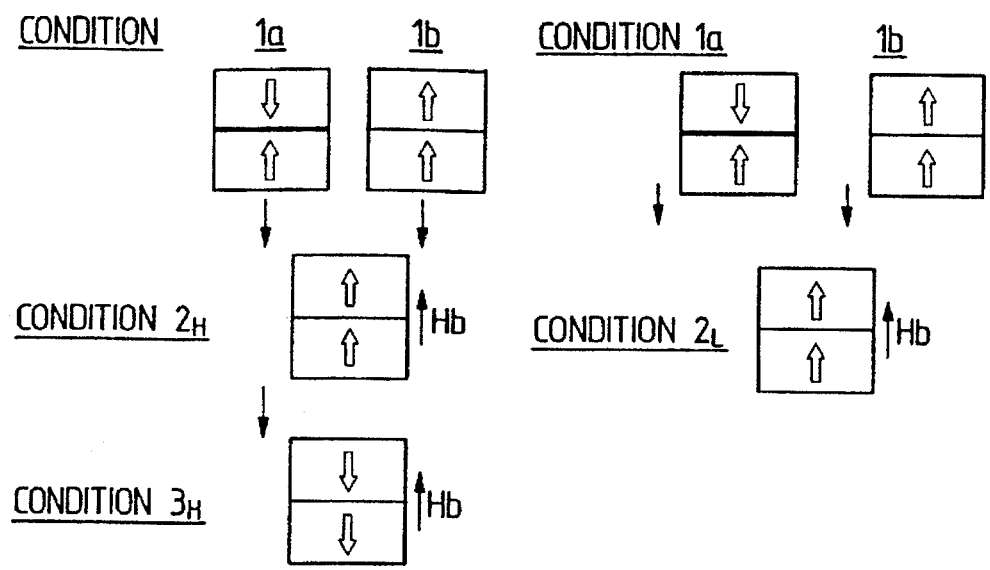
FIG. 17
FIG. 18
MEDIUM NO. 5
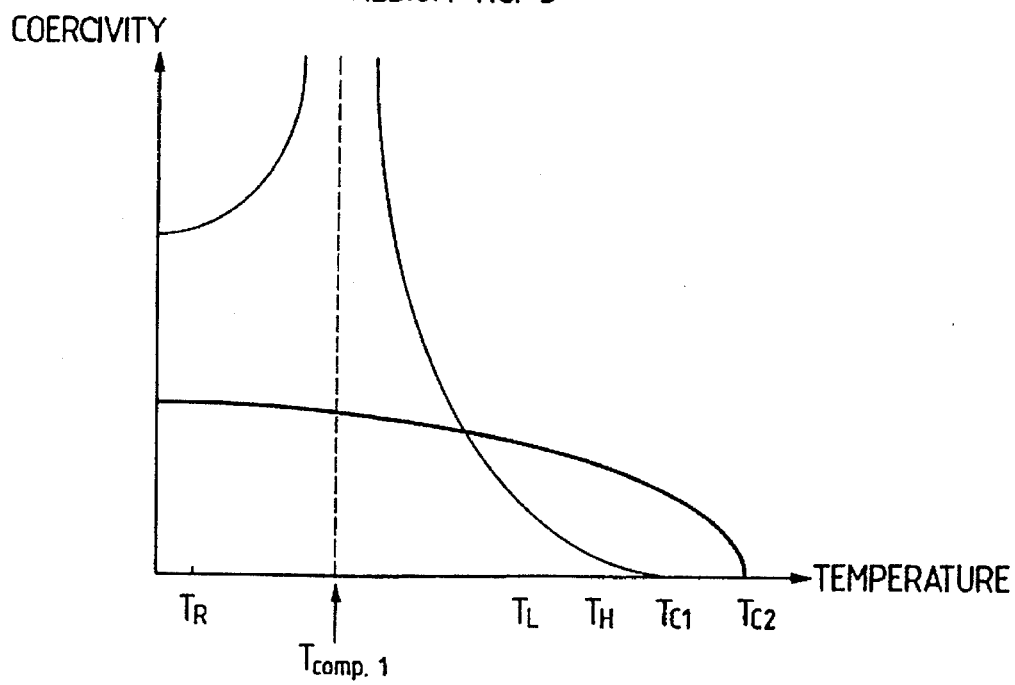

FIG. 21
MEDIUM NO. 7
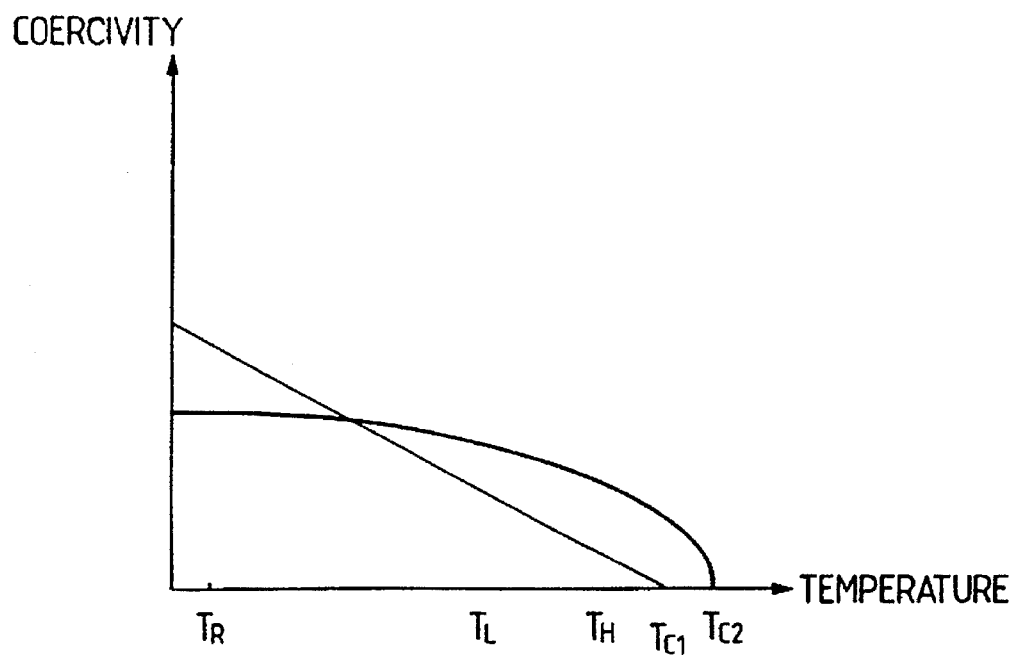
FIG. 22
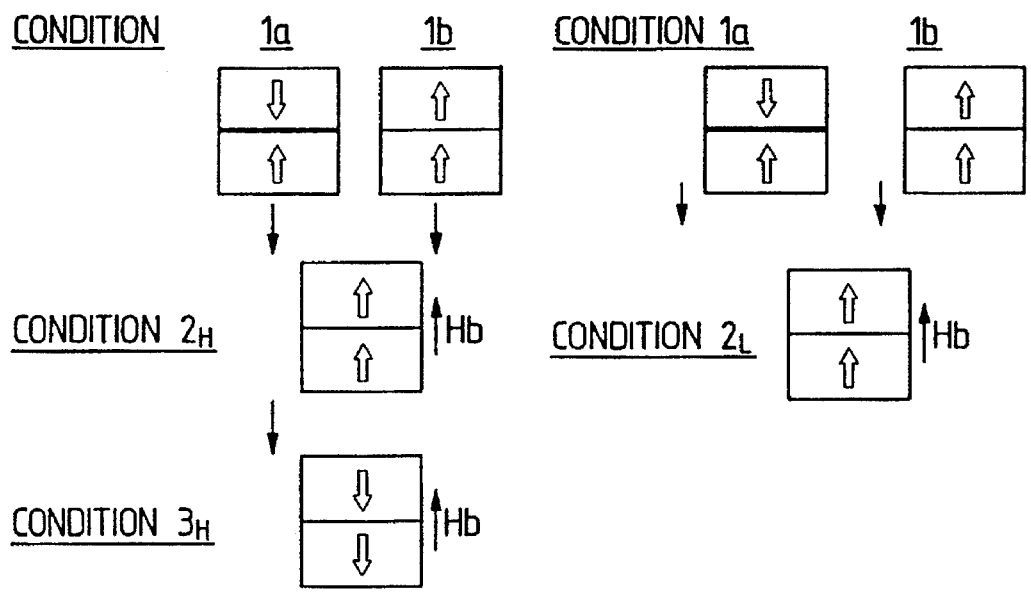
FIG. 23

MEDIUM NO. 8

OVER-WRITABLE METHOD OF MAGNETOOPTICAL RECORDING

This is a continuation of application Ser. No. 07/736,649 filed Jul. 26, 1991, now abandoned, which is a division of application Ser. No. 07/581,199 filed Sep. 10, 1990, now abandoned, which is a continuation of Ser. No. 07/368,849 filed Jun. 20, 1989, abandoned.

BACKGROUND OF THE INVENTION

1. Field of the Invention

The present invention relates to an over-writable method of magnetooptical recording using a modulated optical energy beam.

2. Related Background Art

In recent years, many efforts have been made to develop an optical recording/reproduction method, an optical recording apparatus and a medium used therefor, which can satisfy various requirements including high density, large capacity, high speed access, and high recording/reproduction speed.

Of various optical recording/reproduction methods, the magnetooptical recording/reproduction method is most attractive due to its unique advantages in that information can be erased after use and new information can be written thereon.

A recording medium used in a magnetooptical recording/reproduction method has a perpendicular magnetic anisotropy layer or layers as a recording layer. The magnetic layer comprises, for example, amorphous GdFe, GdCo, GdFeCo, TbFe, TbCo, TbFeCo and the like. Concentric or spiral tracks are formed on the recording layer, and data is recorded on the tracks. Note that in this specification, one of the "upward" and "downward" directions of magnetization with respect to a film surface is defined as an "A direction" and the other one is defined as a "non-A direction". Data to be recorded is binarized in advance, and is recorded by a bit ($B_1$) having "A-directed" magnetization and a bit ($B_0$) having "non-A-directed" magnetization. These bits $B_1$ and $B_0$ correspond to "1" and "0" levels of a digital signal, respectively. In general, the direction of magnetization of the recording tracks can be initially aligned in the "non-A-direction" by applying a strong initializing field before recording. This processing is called "initialization". Thereafter, the bit ($B_1$) having "A-directed" magnetization is formed on the tracks. Data is recorded in accordance with the presence/absence and/or a bit length of the bit ($B_1$).

Principle of Bit Formation

In the bit formation, a characteristic feature of a laser, i.e., excellent coherence in space and time, is effectively used to focus a beam into a spot as small as the diffraction limit determined by the wavelength of the laser light. The focused light is radiated onto the track surface to write data by producing bits less than 1 μm in diameter on the recording layer. In the optical recording, a recording density up to $10^8$ bit/cm$^2$ can be theoretically attained, since a laser beam can be concentrated into a spot with a size as small as its wavelength.

As shown in FIG. 1, in magnetooptical recording, a laser beam L is focused onto a recording layer 1 to heat it, while a bias field (Hb) is externally applied to the heated portion in the direction opposite to the initialized direction. A coercivity Hc of the locally heated portion is decreased below the bias field (Hb). As a result, the direction of magnetization of that portion is aligned in the direction of the bias field (Hb). In this way, reversely magnetized bits are formed.

Ferromagnetic and ferrimagnetic materials differ in the temperature dependencies of the magnetization and Hc. Ferromagnetic materials have Hc which decreases around the Curie temperature and allow data recording based on this phenomenon. Thus, data recording in ferromagnetic materials is referred to as Tc recording (Curie temperature recording)

On the other hand, ferrimagnetic materials have a compensation temperature, below the Curie temperature, at which magnetization (M) becomes zero. The Hc abruptly increases around this temperature and hence abruptly decreases outside this temperature. The decreased Hc is cancelled by a relatively weak field (Hb). Thus, recording is enabled. This process is called Tcomp. recording (compensation point recording).

In this case, however, there is no need to adhere to the Curie point or temperatures therearound, and the compensation temperature. In other words, if a bias field (Hb) capable of cancelling a decreased Hc is applied to a magnetic material having the decreased Hc at a predetermined temperature higher than a room temperature, recording is enabled.

Principle of Reading

FIG. 2 illustrates the principle of data reading based on the magnetooptical effect. Light is an electromagnetic wave with an electromagnetic-field vector normally emanating in all directions in a plane perpendicular to the light path. When light is converted to linearly polarlized beams (Lp) and radiated onto a recording layer (1), it is reflected by or passed through the recording layer (1). At this time, the plane of polarization rotates according to the direction of magnetization (M). This phenomenon is called the magnetic Kerr effect or magnetic Faraday effect.

For example, if the plane of polarization of the reflected light rotates through $\theta_k$ degrees for "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by "non-A-direction" magnetized bit ($B_0$) cannot pass through the analyzer. On the contrary, a product $(X \sin2\theta_k)^2$ of the light reflected by a bit ($B_1$) magnetized along the "A direction" passes through the analyzer and becomes incident on a detector (Photoelectric conversion means). As a result, the bit ($B_1$) magnetized along the "A direction" looks brighter than the bit ($B_0$) magnetized along the "non-A-direction", and the detector produces a stronger electrical signal for the bit ($B_1$). The electrical signal from the detector is modulated in accordance with the recorded data, thus reading the data.

In order to reuse a recorded medium, (i) the medium is initialized again by an initialization apparatus, (ii) an erase head similar to a recording head is arranged in a recording apparatus, or (iii) recorded information is erased using a recording apparatus or an erasing apparatus in pre-processing.

In magnetooptical recording, it has been considered to be impossible to perform an over-write operation capable of recording new information regardless of the presence/absence of recorded information.

If the direction of a bias field Hb can be desirably modulated between an "A direction" and a "non-A direction" as needed, the over-write operation can be performed. However, it is impossible to modulate the direction of the bias field Hb at high speed. For example, when the bias field Hb is applied by a permanent magnet, the direction of the magnet must be mechanically reversed. However, it is difficult to reverse the direction of the magnet at high speed. If the bias field Hb is applied by an electromagnet, the direction of a large-capacity current cannot be modulated at high speed.

However, along with advances in technologies, an over write capable magnetooptical recording method, an over write capable magnetooptical recording medium used therefor, and an over write capable recording apparatus used therefor have been proposed, and disclosed in Japanese Patent Laid-Open (Kokai) No. 62-175948, corresponding to U.S. Ser. No. 870,350 filed on Jun. 4, 1986, abandoned in favor of continuation-in-part application Ser. No. 090,973 filed Aug. 31, 1987, which was abandoned in favor of Ser. No. 453,255 filed Dec. 20, 1989, now U.S. Pat. No. 5,238, 524 (referred to herein initially as a "prior application" and later as a "first prior application"). In the method of the prior application, an intensity of light to be radiated is modulated in accordance with binary information to be recorded without turning on/off the bias field Hb or modulating the direction of the bias field Hb, thus allowing an over-write operation.

The medium described in the prior application has a multilayered structure consisting of a first layer as a recording layer having perpendicular magnetic anisotropy, and a second layer as a reference layer having perpendicular magnetic anisotropy. The second layer is magnetized in the "A direction" by an initial field Hini. immediately before recording while the direction of magnetization of the first layer is left unchanged.

When a laser beam pulse-modulated between high level and low level in accordance with information is radiated onto a medium, (1) in a state wherein a medium temperature is returned to room temperature after irradiation by a high-level beam, a bit having a "non-A-directed" magnetization is formed in the second layer, and a bit having a "non-A-directed" magnetization (P type) or an "A-directed" magnetization (A type) is formed in the first layer depending on the type of medium, and (2) in a state wherein the medium temperature is returned to room temperature after irradiation by a low-level beam, a bit having an "A-directed" magnetization is formed in the second layer, and a bit having an "A-directed" magnetization (P type) or a "non-A-directed" magnetization (A type) is formed in the first layer depending on the type of medium.

In the over-write operation of the prior application, only light is modulated in accordance with information to be recorded, and a bias field is not modulated. This is because it is difficult to modulate a magnetic field at high speed. More specifically, a laser beam used in recording is pulse-modulated in accordance with information to be recorded. This operation per se is also performed in conventional magnetooptical recording, and means for pulse-modulating a beam intensity in accordance with binary information to be recorded is known to those skilled in the art (e.g., THE BELL SYSTEM TECHNICAL JOURNAL, Vol. 62 (1983), 1923–1936).

One feature of the over-write operation of the prior application is a medium used. This medium is a special one having a multilayered structure consisting of a first layer having perpendicular magnetic anisotropy as a recording layer and a second layer having perpendicular magnetic anisotropy as a reference layer. The second layer is magnetized in the "A direction" by the initial field Hini. immediately before recording, while the direction of magnetization of the first layer is left unchanged.

Another feature of the over-write operation of the prior application is high and low levels of a beam intensity. Assume that a laser beam pulse-modulated between high and low levels according to information is radiated on a medium.

(1) In a state wherein the medium temperature is increased to a high temperature $T_H$ by a high-level beam, the magnetizations of both the first and second layers almost or completely disappear. When the beam radiation is stopped and the medium temperature is decreased to be slightly lower than $T_H \approx T_{C2}$, the magnetization of the second layer appears.

In this case, the direction of magnetization of the second layer is aligned in the same direction as the bias field Hb. The aligned direction of magnetization of the second layer is left unchanged or is reversed when the medium temperature is returned to room temperature. In the latter case, a compensation temperature $T_{comp.2}$ is present before the medium temperature reaches the room temperature.

The magnetization of the first layer is controlled by the second layer.

As a result, at room temperature, a bit having a "non-A-directed" magnetization is formed in the second layer, and a bit having a "non-A-directed" magnetization (P type) or an "A-directed" magnetization (A type) is formed in the first layer depending on the type of medium.

(2) On the other hand, in a state wherein the medium temperature is increased to a low temperature $T_L$ by a low-level beam, the direction of magnetization of the second layer may be either the "A direction"=an initialized direction or the "non-A direction". In the latter case, a compensation temperature $T_{comp.2}$ is present before the medium temperature is increased to the low temperature $T_L$. In either case, magnetization is present in the second layer at $T_L$.

When the beam radiation is stopped and the medium temperature is decreased to be slightly lower than $T_L \approx T_{C1}$, the magnetization of the first layer appears. The direction of magnetization of the first layer at this time is controlled by the second layer regardless of the direction of the bias field Hb. The second layer controls the direction of magnetization of the first layer through an interface wall energy.

As a result, at room temperature, a bit having an "A-directed" magnetization is formed in the second layer, and a bit having an "A-directed" magnetization (P type) or a "non-A-directed" magnetization (A type) is formed in the first layer depending on the type of medium.

The beam is not a single beam but "two proximate beams". A first (erasing) beam is turned on at low level and is not modulated in principle, thereby always forming a "non-A-directed (or "A-directed") bit, i.e., erasing previous information. A second (recording) beam is pulse-modulated between high level and base level (including zero level) equal to or lower than the low level in accordance with information, so that an "A-directed (or "non-A-directed") bit is formed to record information (FIG. 3).

In either case, if necessary high and low levels, and base level as needed are given, it is easy for those who are skilled in the art to modulate a beam intensity as described above by partially modifying a modulation means described in the prior application.

In a ooo (or ΔΔΔ) expression, if you read ooo outside the parentheses, you should read ooo outside the parentheses in the following ooo (or ΔΔΔ) expressions. On the contrary, if you select and read ΔΔΔ in the parentheses without reading ooo, you should read ΔΔΔ outside the parentheses without reading ooo in the following ooo (or ΔΔΔ) expressions.

The invention of the prior application is divided into first and second aspects. In both the aspects, the recording medium has a multilayered structure, which is divided into two layers, as shown in FIG. 4A.

The first layer is the recording layer, which exhibits high coercivity at room temperature and has low reversing temperature. The second layer is the reference layer, which exhibits low coercivity at room temperature and has a higher reversing temperature than the first layer. Both the layers comprise perpendicular magnetic anisotropy layers.

Note that each of the first and second layers may comprise a multilayered film.

In the first aspect, the coercivity of a first layer is represented by $H_{C1}$; that of a second layer $H_{C2}$; the Curie temperature of the first layer, $T_{C1}$; that of the second layer, $T_{C2}$; the room temperature, $T_R$; the temperature of the recording medium when a low level laser beam is radiated, $T_L$; that when a high level laser beam is radiated, $T_H$; a coupling field applied to the first layer, $H_{D1}$; and a coupling field applied to the second layer, $H_{D2}$. In this case, the recording medium satisfies the following Formula 1, and satisfies Formulas 2 to 5 at the room temperature:

$$T_R < T_{C1} \approx T_L < T_{C2} \approx T_H \tag{1}$$

$$H_{C1} > H_{C2} + |H_{D1} \mp H_{D2}| \tag{2}$$

$$H_{C1} > H_{D1} \tag{3}$$

$$H_{C2} > H_{D2} \tag{4}$$

$$H_{C2} + H_{D2} < |H_{ini}| < H_{C1} \pm H_{D1} \tag{5}$$

In the above formula, symbol "≈" means "equal to" or "substantially equal to". In addition, of double signs ± and ∓, the upper sign corresponds to an A (antiparallel) type medium, and the lower sign corresponds to a P (parallel) type medium (these media will be described later). Note that the P type medium includes a ferromagnetic material and a magnetostatic coupling medium.

The relationship between the coercivity and the temperature is as shown in the graph of FIG. 5. Referring to FIG. 5. The thin curve represents the characteristics of the first layer and the bold curve represents those of the second layer.

Therefore, when an initial field (Hini.) is applied to the recording medium at room temperature, the direction of magnetization of the second layer is reversed without reversing that of the first layer, according to Formula 5. When the initial field (Hini.) is applied to the recording medium before recording, the second layer can be magnetized in the "A direction" (in the drawings, the "A direction" is indicated by an upward arrow, and the "non-A direction" is indicated by a downward arrow). If the initial field (Hini.) is decreased to zero, the direction of magnetization of the second layer can be left unchanged without being re-reversed, according to Formula 4.

FIG. 4B schematically shows a state wherein only the second layer is magnetized in the "A direction" immediately before recording.

Referring to FIG. 4B the direction of magnetization in the first layer represents previously recorded data. Since the direction of magnetization in the first layer 1 does not change the basic operation mechanism, it is indicated by X in the following description, as shown, for example, in Condition 1 in FIG. 6, for the sake of simplicity.

In Condition 1, the high-level laser beam is radiated onto the recording medium to increase the medium temperature to $T_H$. Since $T_H$ is higher than the Curie temperature $T_{C1}$, magnetization of the first layer 1 disappears. In addition, since $T_H$ is near the Curie temperature $T_{H2}$, magnetization of the second layer 2 also disappears completely or almost completely. The bias field (Hb) in the "A direction" or "non-A direction" is applied to the medium in accordance with the type thereof. The bias field (Hb) can be a stray field from the medium itself. For the sake of simplicity, assume that the bias field (Hb) in the "non-A direction" is applied to the medium. Since the medium is moving, a given irradiated portion is immediately separated from the laser beam and is cooled by air. When the temperature of the medium is decreased in the presence of the field Hb, the direction of magnetization of the second layer is reversed to the "non-A direction" based on the field Hb (Condition $2_H$ in FIG. 6).

When the medium is further cooled and the medium temperature is decreased blow $T_{C1}$, magnetization of the first layer appears again. In this case, the direction of magnetization of the first layer is influenced by that of the second layer due to a magnetic coupling (exchange or magnetostatic coupling) force. As a result, "non-A direction" magnetization (the P type medium) or "A direction" magnetization (the A type medium) is formed in accodance with the type of the medium, as shown in Condition $3_H$ in FIG. 6.

The condition $3_H$ is left unchanged or reversed depending on whether or not the compensation temperature $T_{comp.}$ is present before the medium temperature is decreased to room temperature. As a result, Condition $3_H$ may be changed to the next Condition $4_H$.

A change in condition due to high-level laser beam irradiation is called a high-temperature cycle herein.

Next, in Condition 1 in FIG. 7, the low-level laser beam is radiated onto the medium to increase the medium temperature to $T_L$. Since $T_L$ is near the Curie temperature $T_{C1}$, magnetization of the first layer disappears completely or almost completely. However, since $T_L$ is below the Curie temperature $T_{C2}$, magnetization of the second layer does not disappear (Condition $2_L$ in FIG. 7). In Condition $2_L$, although the bias field (Hb) is unnecessary, it cannot be turned on or off at high speed. Therefore, the bias field (Hb) is left applied inevitably.

Since the coercivity $H_{C2}$ is maintained high, the direction of magnetization of the second layer will not be reversed due to field Hb. Since the medium is moving, a given irradiated portion is immediately separated from the laser beam and is cooled by air. As cooling progresses, magnetization of the first layer appears. The direction of magnetization is influenced by that of the second layer due to the magnetic coupling force. As a result, "A direction" magnetization (the P type medium) or "non-A direction" magnetization (the A type medium) appears in accordance with the type of the medium, (Condition $3_L$ in FIG. 7).

This Condition $3_L$ is left unchanged or reversed depending on whether or not the compensation temperature $T_{comp.}$ is present before the medium temperature is decreased to room temperature. As a result, Condition $3_L$ may be changed to the next Condition $4_L$.

A change in condition due to low-level laser beam irradiation is called a low temperature cycle herein.

FIGS. 8A, 8B summarize the above descriptions. Referring to FIGS. 8A, 8B, bits, having either "A direction" magnetization or "non-A direction" magnetization, which are opposite to each other, are formed in the high- and low-temperature cycles regardless of the direction of magnetization in the first layer. More specifically, an over-write operation is enabled by pulse modulating the laser beam between high level (high-temperature cycle) and low level (low-temperature cycle) in accordance with data to be recorded.

Note that the recording medium normally has a disk shape, and is rotated during recording. For this reason, a recorded portion (bit) is again influenced by the initial field (Hini.) which is applied by initial field applying means during a single rotation. As a result, the direction of magnetization of the second layer is aligned along the original "A direction". However, at the room temperature magnetization of the first layer, and the recorded data can be held.

If linearly polarized light is radiated onto the first layer, since light reflected thereby includes data, data can be reproduced as in the conventional magnetooptical recording medium.

A perpendicular anisotropy film constituting the first layer and the second layer is selected from the group consisting of (1) crystalline or amorphous ferromagnetic or ferrimagnetic materials having the Curie temperature and no compensation temperature, and (2) crystalline or amorphous ferrimagnetic materials having both the compensation temperature and the Curie temperature.

The first aspect utilizing the Curie temperature has been described. In contrast to this, the second aspect of the present invention utilizes decreased coercivity $H_C$ at a predetermined temperature exceeding the room temperature. The second aspect uses a temperature $T_{S1}$ at which the first layer is magnetically coupled to the second layer, in place of the temperature $T_{C1}$ in the first aspect. In addition, instead of the temperature $T_{C2}$, a temperature $T_{S2}$ at which the second layer is reversed under the influence of the field Hb is used. Thereby, the second aspect can provide the same effect as in the first aspect.

In the second aspect, the coercivity of the first layer is represented by $H_{C1}$: that of the second layer, $H_{C2}$; a temperature at which the first layer is magnetically coupled to the second layer $T_{S1}$; a temperature at which the direction of magnetization of the second layer is reversed upon influence of the field Hb, $T_{S2}$; room temperature, $T_R$; a temperature of the medium when a low-level laser beam is applied thereto, $T_L$; a temperature of the medium when a high-level laser beam is applied thereto $T_H$; a coupling field applied to the first layer, $H_{D1}$; and a coupling field applied to the second layer, $H_{D2}$. In this case, the recording medium satisfies the following Formula 6, and satisfies Formulas 7 to 10 at the room temperature:

$$T_R < T_{S1} \approx T_L < T_{S2} \approx T_H \tag{6}$$

$$H_{C1} > H_{C2} + |H_{D1} \mp H_{D2}| \tag{7}$$

$$H_{C1} > H_{D1} \tag{8}$$

$$H_{C2} > H_{D2} \tag{9}$$

$$H_{C2} + H_{D2} < |\text{Hini.}| < H_{C1} \pm H_{D1} \tag{10}$$

In the above formulas, upper signs of double signs ± and ∓ correspond to an A (antiparallel) type medium, and lower signs correspond to a P (parallel) type medium (these media will be described later).

In the first and second aspects, the recording medium is constituted by the first and second layers, each of the which preferably comprises an amorphous ferrimagnetic material selected from transition metal (e.g., Fe, Co)—heavy rare earth metal (e.g., Gd, Tb, Dy, and the like) alloy compositions.

When the first and second layers are both selected from the transition metal—heavy rare earth metal alloy compositions, the direction and level of magnetization appearing outside the alloy are determined by the relationship between the direction and level of spin of transition metal atoms (to be referred to as TM hereinafter) and those of heavy rare earth metal atoms (to be referred to as RE hereinafter) inside the alloy. For example, as shown in FIG. 9A, the direction and level of TM spin are represented by a dotted vector TM-1, those of RE spin are indicated by a solid vector RE-1, and the direction and level of magnetization of the alloy as a whole are represented by a double-solid vector MA-1. In this case, the vector MA-1 is represented by a sum of vectors TM-1 and RE-1. However, in the alloy, the vectors TM and RE are directed in the opposite directions due to the mutual effect of the TM spin and the RE spin. Therefore, when these vectors are equal to each other, the sum of vectors TM-2 and RE-1 or the sum of vectors TM-2 and RE-1 is zero (i.e., the level of magnetization appearing outside the alloy is zero). The alloy composition making the sum of vectors zero is called a compensation composition. When the alloy is another composition, the sum vector has a strength equal to a difference between the strengths of both the spins, and has a direction equal to that of the larger spin vector. Magnetization of this vector appears outside the alloy. For example, as shown in FIG. 9B, a pair of vectors correspond to a vector MA-1 (model 1), and a pair of vectors correspond to a vector MA-2 (model 2).

When the strength of one of the vectors of the RM spin and TM spin is larger than the other, the alloy composition is referred to as "XX rich" named after the larger spin name (e.g., RE rich).

The first and second layer can be classified into TM rich and RE rich compositions. Therefore, if the composition of the first layer is plotted along the ordinate and that of the second layer is plotted along the abscissa, the types of the recording media according to the present invention can be classified into four quardrants, as shown in FIG. 10. The P type medium described previously belongs to Quadrant I and III, and the A type medium belongs to Quadrant II and IV. Referring to FIG. 10, the intersection (origin) of the abscissa and the ordinate represents the compensation composition of both the layers.

In view of a change in coercivity against a change in temperature, a certain alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature (Tcomp.). No compensation temperature is present between the room temperature and the Curie temperature in the TM rich alloy composition. The compensation temperature below the room temperature is irrelevent in the magnetooptical recording, and hence, it is assumed in this specification that the compensation temperature is present between the room temperature and the Curie temperature.

If the first and second layers are classified in view of the presence/absence of the compensation temperature, the recording medium can be classified into four types. The recording medium in Quadrant I includes all the four types of media. The graphs of FIGS. 11A to 11D respectively show the relationship between the coercivity and the temperature of the four types of media. Note that thin curves represent characteristics of the first layer and bold curves represent those of the second layer.

When the first (recording) layer and the second (reference) layer are classified in view of their RE or TM rich characteristics and in view of the presence/absence of the compensation temperature, they can be classified into 9 classes.

TABLE 1

Quadrant I

| Class | First Layer: RE rich | Second Layer: RE rich | Type |
|---|---|---|---|
| 1 | Tcomp. | Tcomp. | 1 |
| 2 | No Tcomp. | Tcomp. | 2 |
| 3 | Tcomp. | No Tcomp. | 3 |
| 4 | No Tcomp. | No Tcomp. | 4 |

Quadrant II

| Class | First Layer: RE rich | Second Layer: TM rich | Type |
|---|---|---|---|
| 5 | Tcomp. | No Tcomp. | 3 |
| 6 | No Tcomp. | No Tcomp. | 4 |

Quadrant III

| Class | First Layer: TM rich | Second Layer: TM rich | Type |
|---|---|---|---|
| 7 | No Tcomp. | No Tcomp. | 4 |

Quadrant IV

| Class | First Layer: TM rich | Second Layer: RE rich | Type |
|---|---|---|---|
| 8 | No Tcomp. | Tcomp. | 2 |
| 9 | No Tcomp. | No Tcomp. | 4 |

However, with the medium disclosed in detail in the prior application, it is difficult to obtain an over write capable magnetooptical recording medium which has a high C/N ratio without decreasing recording sensitivity.

An invention for providing an over write capable magnetooptical recording with a high C/N ratio without decreasing recording sensitivity is disclosed in a patent application filed in Japan on Apr. 28, 1988 (Japanese Patent Application No. 63-105833) and is also disclosed in a counterpart U.S. application Ser. No. 343,361 filed Apr. 26, 1989, abandoned in favor of a continuation application Ser. No. 580,361 filed Sep. 10, 1990, now abandoned. This application will be referred to as a second "prior application" hereinafter.

A large difference between the medium disclosed in detail in the first prior application and the medium of the second prior application is a low-temperature cycle.

In the former medium, magnetization of the first layer completely or almost disappears at the low temperature $T_L$. When the medium is moved relative to the beam and falls outside a beam spot region, the medium begins to be cooled.

When the medium temperature is decreased to be slightly lower than a Curie temperature $T_{C1}$ of the first layer, the magnetization of the first layer appears. In this case, the magnetization of the second layer influences the first layer through an interface wall energy $\sigma_w$. As a result, a magnetization in a stable direction with respect to that of the second layer appears in the first layer. More specifically, the magnetization appears in a parallel or antiparallel direction in accordance with the type of medium at that temperature. The direction of magnetization of the first layer is held even if the bias field Hb is positively or negatively applied.

In contrast to this, in the latter medium, weak magnetization is left in the first layer. However, in this case, a coercivity $H_{C1}$ of the first layer, the bias field Hb, and a magnetic field=$\sigma_w/2M_{S1}t_1$ influencing the first layer from the second layer through the interface wall energy $\sigma_w$ hold a specific relationship. In the specific relationship, the magnetization of the second layer aligns the magnetization of the first layer in a direction not to form a magnetic wall at an interface with the second layer (i.e., in a stable direction) regardless of the direction of the bias field Hb. More specifically, the magnetization of the first layer is forcibly aligned in a parallel or antiparallel direction in accordance with the type of medium at that temperature.

Thereafter, the former and latter media are cooled to room temperature. When the compensation temperature $T_{comp}$ is present before the medium temperature reaches room temperature, the directions of magnetization of both the first and second layers are reversed.

However, a bit formed in the low-temperature cycle has the following magnetization at room temperature. More specifically, the second layer has a bit having an "A-directed" magnetization initialized by Hini. and the first layer has a bit having an "A-directed" or "non-A-directed" magnetization according to the type of medium.

In either case, the medium disclosed in detail in the first prior application and the medium of the second prior application have at least one of (1) a first problem that a C/N ratio is not satisfactorily high in a reproduction mode, (2) a second problem that Hini. must be increased to be relatively high at room temperature (10° to 45°) in a recording mode and hence, a recording apparatus becomes bulky, and (3) a third problem that a laser beam intensity must be relatively high, a light source of a recording apparatus becomes large in size, and power consumption is increased.

SUMMARY OF THE INVENTION

It is therefore an object of the present invention to provide an over writable method of magnetooptical recording using a magnetooptical recording medium (1) which has a satisfactorily high C/N ratio in a reproduction mode, (2) which can decrease Hini. to a relatively low value at room temperature in a recording mode, and (3) which can decrease a laser beam intensity to a relatively low level.

Since the intensity of the initial field Hini. depends on the coercivity $H_{C2}$ of the second layer at room temperature, an alloy composition having low coercivity $H_{C2}$ at room temperature must be selected (2) in order to decrease Hini.

In this case, the compensation temperature $T_{comp.2}$ of the second layer is generally separated from room temperature in a higher or lower direction.

However, according to the experiments of the present inventor, it was found that an alloy composition whose $T_{comp.2}$ is near room temperature must be selected (1) in order to satisfactorily increase the C/N ratio in the reproduction mode.

Therefore, in order to meet both the requirements, it was found that an alloy composition having a temperature characteristic in which coercivity is low at room temperature, immediately rises toward the compensation temperature, and immediately falls when the medium temperature exceeds the compensation temperature is preferable.

The present inventor made extensive studies of such an alloy composition for a long period of time, and found a preferable alloy composition among a GdDyFe alloy, a GdDyFeCo alloy, a DyFeCo alloy, and a TbDyFeCo alloy.

However, an alloy composition selected from the GdDyFe alloy and the GdDyFeCo alloy has a small product of a saturation magnetic moment $M_S$ and coercivity $H_C$. Therefore, the film thickness t of the second layer must be increased in order to satisfy the following over-write condition formula:

$$t_2 > \frac{\sigma_w}{2 M_{S2} H_{C2}}.$$

For this reason, it was found that the intensity of a laser beam for increasing the medium temperature to the low temperature $T_L$ and the high temperature $T_H$ must be increased (third problem).

However, the following composition selected from the DyFeCo alloy and TbDyFeCo alloy:

$$(Tb_U Dy_{100-U})_V (Fe_{100-W} Co_W)_{100-V}$$

(for U=0 to 50 atomic %
V=15 to 35 atomic %
W=1 to 50 atomic %)
can satisfy the objects of the present invention without the third problem, and the present invention was thus reached.

Therefore, according to the present invention, there is provided an over-writable method of magnetooptical recording using an over write capable magnetooptical recording medium which has a multilayered structure consisting of a first layer having perpendicular magnetic anisotropy as a recording layer and a second layer having perpendicular magnetic anisotropy as a reference layer, wherein if one of an upward or downward direction with respect to a layer plane is given as an "A direction" and the other is given as a "non-A direction", a magnetization of the first layer is left unchanged and only a magnetization of the second layer is aligned in the "A direction" by an initial field Hini. immediately before recording, when a laser beam pulse-modulated between high and low levels according to information is radiated onto a medium, (1) if the beam is at high level, a medium temperature is increased to a high temperature $T_H$ and a non-modulated bias field Hb is applied in this temperature state, or the non-modulated bias field Hb is applied when the beam radiation is stopped and the medium temperature is decreased to room temperature, so that, at room temperature, a bit having a "non-A-directed" magnetization is formed in the second layer, and a bit having a "non-A-directed" magnetization (or an "A-directed" magnetization) is formed in the first layer depending on the type of medium, and (2) if the beam is at low level, the medium temperature is increased to a low temperature $T_L$, and in this temperature state, (2-1) at least the magnetization of the second layer remains, and even if the non-modulated bias field Hb is applied in a positive (parallel) direction or in a negative (antiparallel) direction, the remaining magnetization of the second layer acts, or (2-2) even if the non-modulated bias field Hb is applied in the positive or negative direction while the beam radiation is stopped and the medium temperature is decreased to room temperature, the remaining magnetization of the second layer acts, so that, at room temperature, a bit having an "A-directed" magnetization is formed in the second layer, and a bit having an "A-directed" magnetization (or a "non-A-directed" magnetization) is formed in the first layer depending on the type of medium, whereby an over-write operation by only modulating a laser beam can be performed, characterized in that at least the second layer is selected from an alloy composition represented by the Formula:

$$(Tb_U Dy_{100-U})_V (Fe_{100-W} Co_W)_{100-V}$$

(for U=0 to 50 atomic %
V=15 to 35 atomic %
W=1 to 50 atomic %).

In this invention, the reason why the ratios of elements are limited is as follows.

When U exceeds 50 atomic %, the gradient of the temperature characteristic of the coercivity toward the compensation temperature $T_{comp.2}$ becomes moderate, and Hini. is increased.

If V falls outside the range of 15 to 35 atomic %, the compensation temperature $T_{comp.2}$ is separated too much from the room temperature, and the C/N ratio is decreased.

If W is smaller than 1 atomic %, a Curie temperature becomes too low and a margin for an environmental temperature is decreased, and if W exceeds 50 atomic %, the Curie temperature $T_{C2}$ becomes too high and recording sensitivity is impaired.

An alloy composition used in the present invention has a small $M_S \cdot H_C$ product as compared to a TbFeCo alloy, and the temperature characteristic of the coercivity is low at room temperature, and its gradient toward the compensation temperature $T_{comp.2}$ is steep. Therefore, (2) Hini. can be decreased, and (1) the C/N ratio can be increased.

Since the alloy composition of the present invention has a large $M_S \cdot H_C$ product as compared to a GdDyFeCo alloy, (3) the film thickness $t_2$ can be decreased, and as a result, the beam intensity can be low.

In the alloy composition of the present invention:

$$(Tb_U Dy_{100-U})_V (Fe_{100-W} Co_W)_{100-V}$$

it is preferable to satisfy:
U=1 to 40 atomic %
V=15 to 35 atomic %
W=10 to 40 atomic %.

The medium of the present invention has one of the following three relationships between the temperature characteristics of the first and second layers:

(i) $T_R < T_{C1} \approx T_L < T_{C2} \approx T_X$
(ii) $T_R < T_L < T_{C1} < T_H \leq T_{C2}$
(iii) $T_R < T_L < T_H \leq T_{C1} \leq T_{C2}$ where $T_R$: room temperature
$T_{C1}$: Curie temperature of first layer
$T_{C2}$: Curie temperature of second layer
$T_L$: temperature of recording medium when low-level laser beam is radiated
$T_H$: temperature of recording medium when high-level laser beam is radiated.

When the medium (i) is heated to the low temperature $T_L$ in the low-temperature cycle, the magnetization of the first layer almost or completely disappears. On the other hand, the magnetization of the second layer remains. More specifically, the low-temperature cycle is the same as that of a medium disclosed in detail in the first prior application.

When the media (ii) and (iii) are heated to the low temperature $T_L$ in the low-temperature cycle, the magnetizations of both the first and second layers remain. Therefore, the low-temperature cycle is the same as that of the second prior application.

In summary, a bit having the following magnetization is formed in any of the media (i), (ii), and (iii) in the low-temperature cycle. That is, a bit having an "A-directed" magnetization initialized by Hini. is formed in the second layer, and a bit having an "A-directed" (or "non-A-directed") magnetization is formed in the first layer depending on the type of medium.

On the other hand, a high-temperature cycle is as follows.

When the medium (i) is heated to the high temperature $T_H$, the magnetization of the first layer completely disappears, and the magnetization of the second layer almost or completely disappears.

When the medium is moved relative to the beam spot and falls outside a beam spot region, the medium begins to be cooled. When the medium temperature is decreased to be slightly lower than $T_{C2}$, the magnetization of the second layer appears. In this case, the direction of magnetization of the second layer is aligned in the same direction as the bias field Hb. In this case, the magnetization of the first layer remains disappeared.

The medium is further cooled. When the medium temperature passes the compensation temperature $T_{comp.2}$ during a cooling process, the direction of the previously appeared magnetization of the second layer is reversed.

When the medium temperature is decreased to be slightly lower than $T_{C1}$, a magnetization of the first layer appears. In this case, the magnetization of the second layer influences the first layer through an interface wall energy. As a result, a magnetization in a stable direction which does not form a magnetic wall at an interface with the second layer appears in the first layer. More specifically, the magnetization parallel or antiparallel to that of the second layer appears in the first layer depending on the type of medium at that temperature.

The magnetization of the first layer is held thereafter regardless of the direction of the bias field Hb. The medium is cooled further, and its temperature then reaches room temperature.

When the medium temperature passes the compensation temperature $T_{comp}$. during the cooling process, the direction of magnetization of the first or second layer is reversed. As a result, a bit formed in the high-temperature cycle has the following magnetization at room temperature. More specifically, a bit formed in the second layer has a magnetization in a direction opposite to the "A direction" initialized by Hini., and a bit formed in the first layer has a magnetization in the "non-A direction" or "A direction" depending on the type of medium.

When the medium (ii) is heated to the high temperature $T_H$ in the high-temperature cycle, the magnetization of the first layer completely disappears. However, the magnetization of the second layer is classified into two states, i.e., (ii-1) weak but clear magnetization remains and (ii-2) the magnetization almost or completely disappears. The medium (ii-1) exhibits the following high-temperature cycle. Since the coercivity at high temperature is weak, the direction of magnetization of the second layer obeys the bias field Hb and is aligned in the same direction as the bias field Hb. In this case, the magnetization of the first layer remains disappeared.

When the medium is moved relative to the beam and falls outside a beam spot region, the medium begins to be cooled. When the medium temperature passes the compensation temperature $T_{comp.2}$ during a cooling process to room temperature, the direction of magnetization of the second layer obeying the field Hb is reversed.

When the medium temperature is decreased to be slightly lower than $T_{C1}$, the magnetization of the first layer appears. Thereafter, the same low-temperature cycle as that of the medium (i) is exhibited.

As a result, a bit formed in the high-temperature cycle has the following magnetization at room temperature. More specifically, a bit formed in the second layer has a magnetization in a direction opposite to the "A direction" initialized by Hini., and a bit formed in the first layer has a magnetization in the "non-A direction" or "A direction" depending on the type of medium.

The medium (ii-2) exhibits the same high-temperature cycle as that of the medium (i).

When the medium (iii) is heated to the high temperature $T_H$, its magnetization is classified into three states, i.e., (iii-1) weak but clear magnetizations of both the first and second layers remain, (iii-2) the magnetization of the first layer almost or completely disappears and weak but clear magnetization remains in the second layer, and (iii-3) the magnetizations of both the first and second layers almost or completely disappear.

The medium (iii-1) exhibits the following high-temperature cycle.

At the high temperature $T_H$, since the magnetizations left in the first and second layers are considerably weak, they obey the bias field Hb and are aligned in the same direction as the field Hb.

When the medium is moved relative to the beam and falls outside a beam spot region, the medium begins to be cooled.

As the medium is cooled, the magnetization of the second layer is considerably increased relative to that of the first layer. For this reason, the magnetization of the second layer controls the direction of magnetization of the first layer through an interface wall energy. That is, the same phenomenon as that in the low-temperature cycle occurs.

The controlled magnetization of the first layer is held regardless of the direction of the bias field Hb.

The medium temperature is further decreased to room temperature. When the medium temperature passes the compensation temperature $T_{comp.2}$ during the cooling process, the directions of the magnetization of the second layer obeying Hb and the magnetization of the first layer controlled by the second layer are reversed.

A bit formed in the high-temperature cycle has the following magnetization at room temperature. More specifically, a bit formed in the second layer has a magnetization in a direction opposite to the "A direction" initialized by Hini., and a bit formed in the first layer has a magnetization in the "non-A direction" or "A direction" depending on the type of medium.

The medium (iii-2) exhibits the following high-temperature cycle.

At the high temperature $T_H$, since the magnetization remaining in the second layer is considerably weak, it obeys the bias field Hb and is aligned in the same direction as the field Hb. In this case, the magnetization of the first layer remains disappeared.

When the medium is moved relative to the beam and falls outside a beam spot region, the medium begins to be cooled.

When the medium temperature is decreased to be slightly lower than $T_{C1}$, the magnetization of the first layer appears. In this case, the magnetization of the second layer influences the first layer through an interface wall energy. For this reason, the magnetization of the first layer appears in a stable direction so as not to form a magnetic wall at an interface with the second layer. The magnetization of the second layer controls the direction of magnetization of the first layer. That is, the magnetization of the first layer is aligned parallel or or antiparallel to that of the second layer depending on the type (P or A type) of the medium at that temperature.

The magnetization of the first layer is held thereafter regardless of the direction of the bias field Hb.

Thereafter, the medium is further cooled to room temperature. When the medium temperature passes the compensation temperature $T_{comp.2}$ during the cooling process, the directions of the magnetization of the second layer obeying Hb and the magnetization of the first layer are reversed.

A bit formed in the high-temperature cycle has the following magnetization at room temperature. More specifically, a bit formed in the second layer has a magnetization in a direction opposite to the "A direction" initialized by Hini., and a bit formed in the first layer has a magnetization in the "non-A direction" or "A direction" depending on the type of medium.

The medium (iii-3) exhibits the following high-temperature cycle.

At the high temperature $T_H$, the magnetizations of both the first and second layers almost or completely disappear.

When the medium is moved relative to the beam and falls outside a beam spot region, the medium begins to be cooled.

When the medium temperature is decreased to be slightly lower than $T_{C1}$ and $T_{C2}$, the magnetizations of the first and second layers appear. In this case, the directions of magnetization of the first and second layers obey the bias field Hb and are aligned in the same direction as the field Hb.

The medium is further cooled. As the medium is cooled, the magnetization of the second layer is considerably increased relative to that of the first layer. For this reason, the magnetization of the second layer controls the direction of magnetization of the first layer through an interface wall energy. That is, the same phenomenon as that in the low-temperature cycle occurs.

The controlled magnetization of the first layer is held regardless of the direction of the bias field Hb.

The medium temperature is further decreased to room temperature. When the room temperature passes the compensation temperature $T_{comp.2}$ during the cooling process, the directions of the magnetization of the second layer obeying Hb and the magnetization of the first layer controlled by the second layer are reversed.

A bit formed in the high-temperature cycle has the following magnetization at room temperature. More specifically, a bit formed in the second layer has a magnetization in a direction opposite to the "A direction" initialized by Hini., and a bit formed in the first layer has a magnetization in the "non-A direction" or "A direction" depending on the type of medium.

In this manner, an alloy composition allowing an over-write method in which only an intensity of a laser beam is modulated according to information without modulating the bias field Hb according to information satisfies the following four conditions at room temperature:

$$H_{C1} > H_{C2} + |H_{P1} \mp H_{P2}|$$

$$H_{C1} > H_{P1}$$

$$H_{C2} > H_{P2}$$

$$H_{C2} + H_{P2} < |Hini.| < H_{C1} \pm H_{P1}$$

where $H_{C1}$: coercivity of first layer
$H_{C2}$: coercivity of second layer
$H_{D1}$: coupling field applied to first layer
$H_{D2}$: coupling field applied to second layer
Hini.: initial field.

BRIEF DESCRIPTION OF THE DRAWINGS

FIGS. 9A and 9B are diagrams for explaining various magnetic fields;

FIG. 10 is a map wherein the types of media of the present invention are classified into four quadrants;

FIGS. 13 and 14 are diagrams showing changes in the direction of magnetization in high- and low-temperature cycles of a medium No. 1;

FIGS. 16 and 17 are diagrams showing the changes in the direction of magnetization in high and low-temperature cycles of a medium No. 4;

FIG. 18 is a graph showing the relationship between coercivity and the temperature for a medium No. 5;

FIG. 21 is a graph showing the relationship between coercivity and the temperature for a medium No. 7;

FIGS. 22 and 23 are diagrams showing the changes in the direction of magnetization in high- and low-temperature cycles of a medium No. 7;

PRINCIPLE OF THE OVER-WRITE OPERATION

The principle of the over-write operation will be described in detail below with reference to a specific medium belonging to Class 1 recording medium (P type, Quadrant I, type 1) shown in Table 1. The medium No. 1 satisfies formulas 11-1 and 11-2:

$$T_R < T\text{comp.1} < T_L < T_H \leq T_{C1} \leq T_{C2} \qquad (11\text{-}1)$$

$$T_{comp.2} < T_{C1} \quad (11\text{-}2).$$

For the sake of descriptive convenience, the following description will be given for $T_H < T_{C1} < T_{C2}$ and $T_L < T_{comp.2}$.

Figure 1:
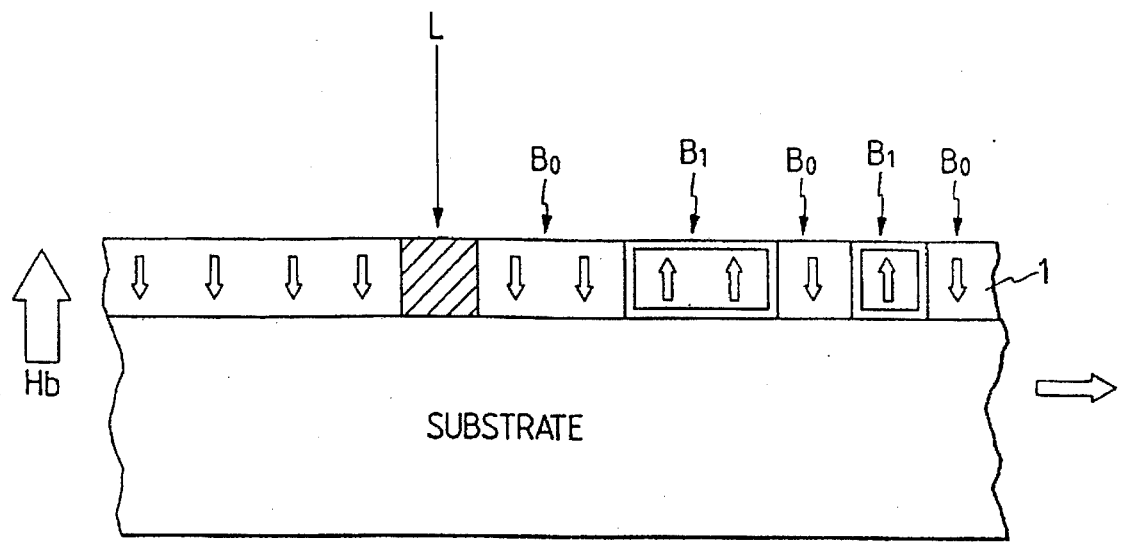
FIG. 1 is an illustration for explaining a recording principle of a magnetooptical recording method.
Figure 2:
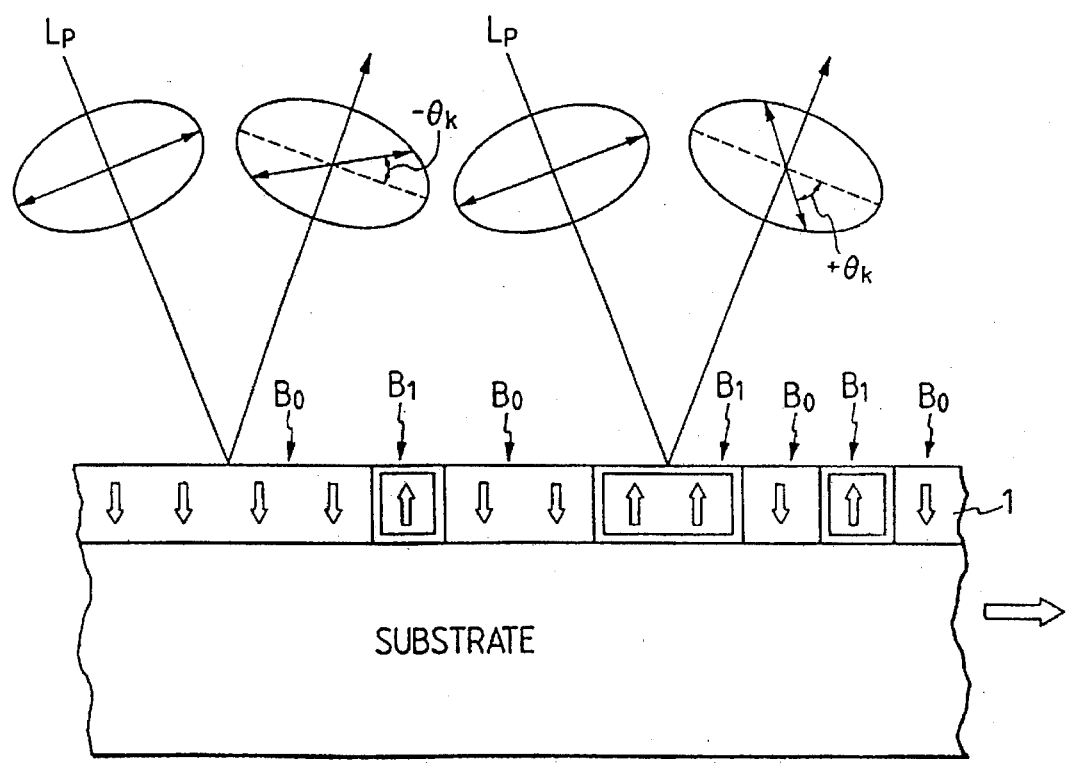
FIG. 2 is an illustration for explaining a reading principle of the magnetooptical recording method.
Figure 3:
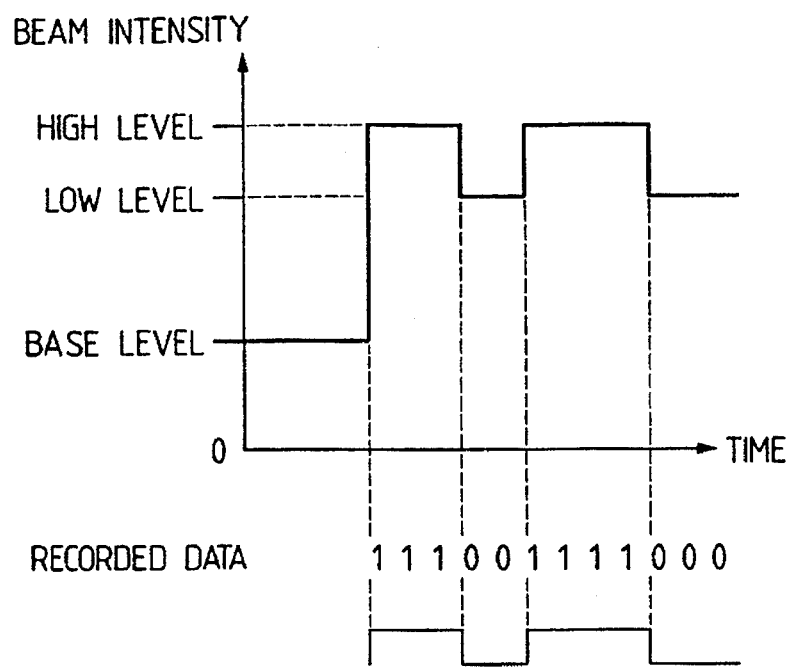
FIG. 3 is a chart showing laser beam intensity levels for recorded data.
Figure 4A:
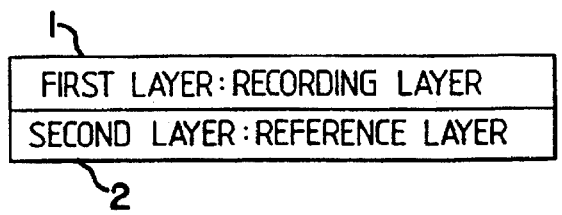
FIG. 4A is a diagram of a multilayered structure of a recording medium.
Figure 4B:
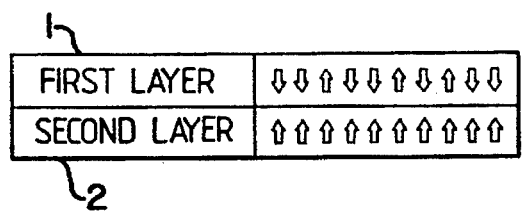
FIG. 4B is a diagram showing the direction of magnetization of a recording layer and a reference layer.
Figure 5:
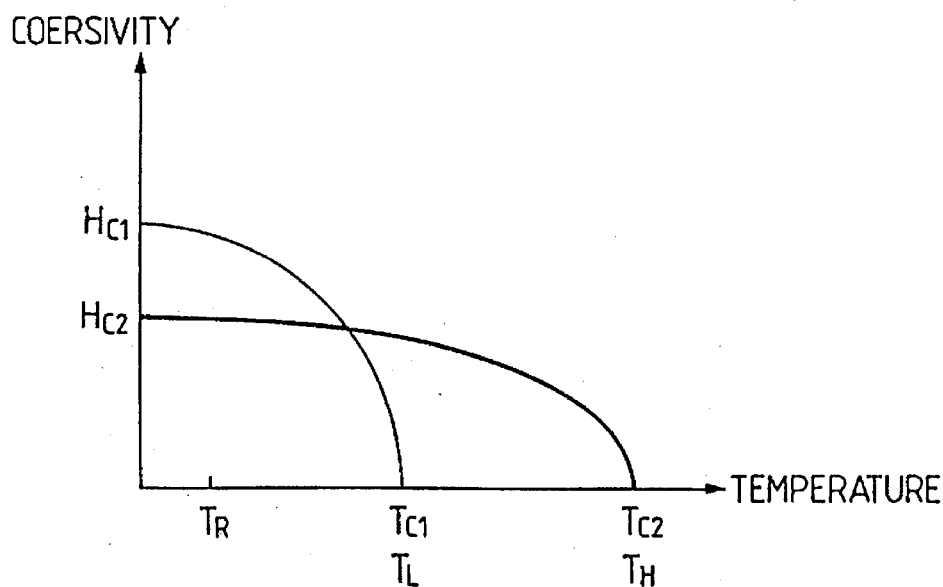
FIG. 5 is a graph showing the relationship between coercivity and temperature.
Figure 6:
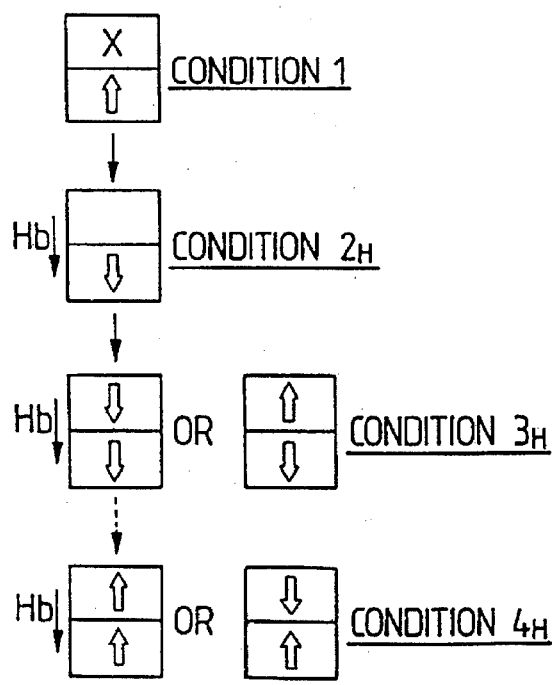
FIG. 6 illustrates changes in the direction of magnetization at high level.
Figure 7:
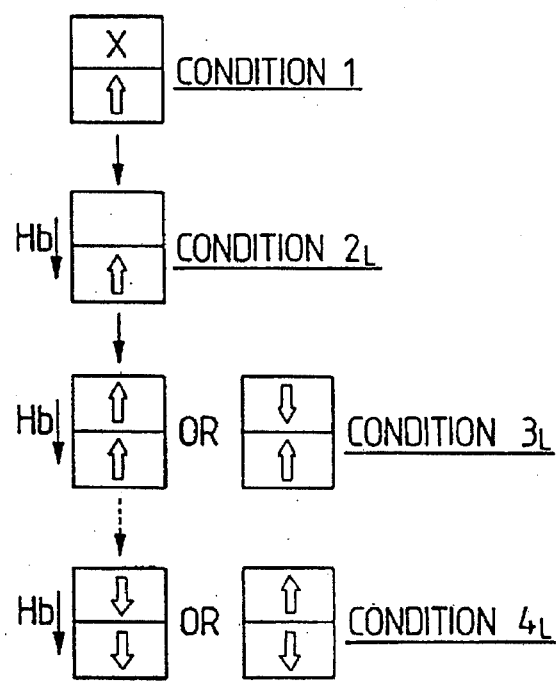
FIG. 7 illustrates changes in the direction of magnetization at low level.
Figure 8A:
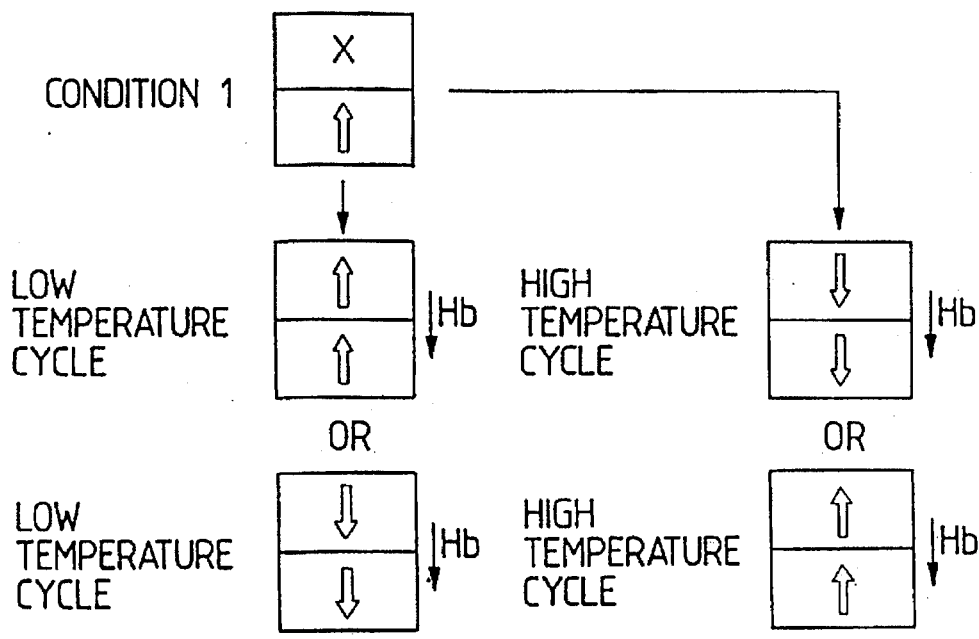
FIGS. 8A and 8B illustrate flows of the changes in the direction of magnetization shown in FIGS. 5 and 6 for respective P- and A-type media, respectively.
Figure 8B:
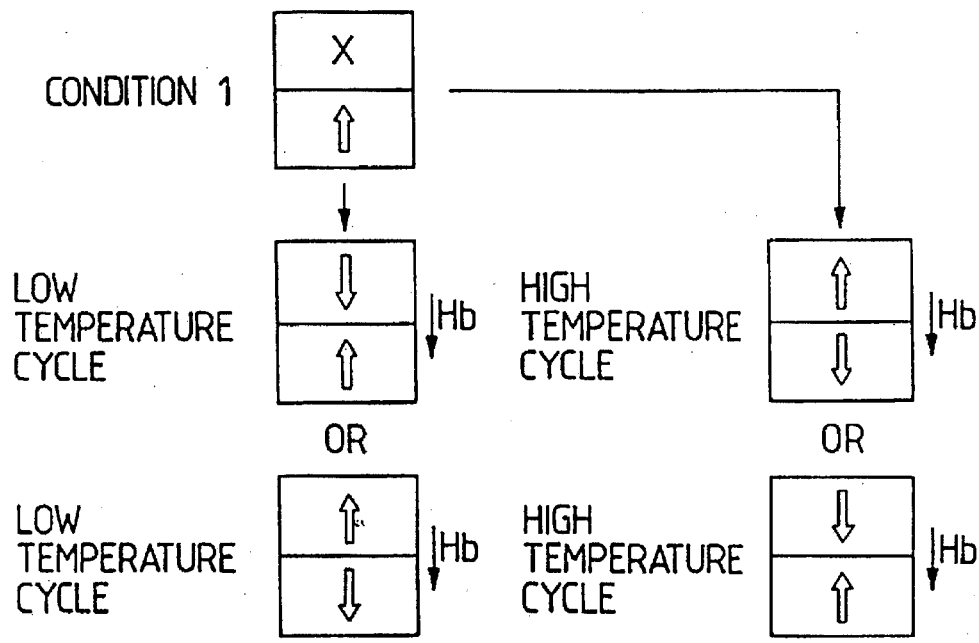
Figure 11A:
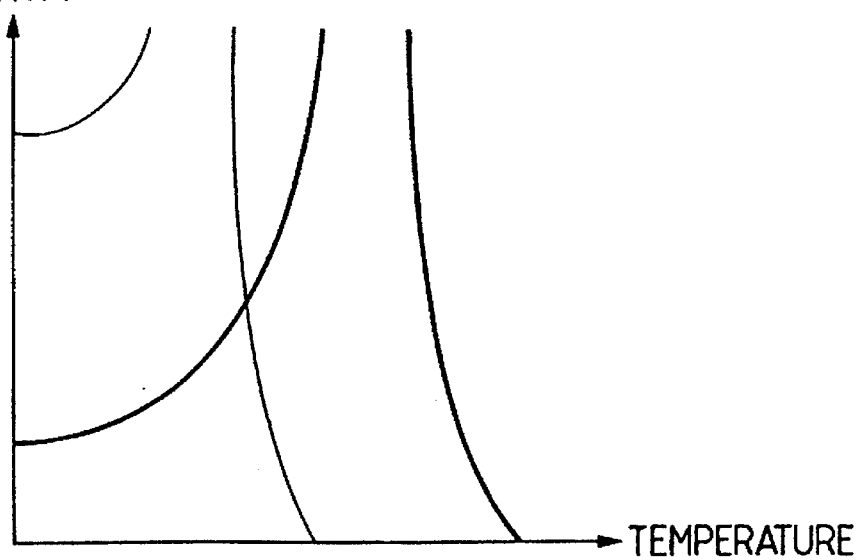
FIGS. 11A to 11D are graphs showing the relationship between the coercivity and the temperature respectively for media of Types I to IV.
Figure 11B:
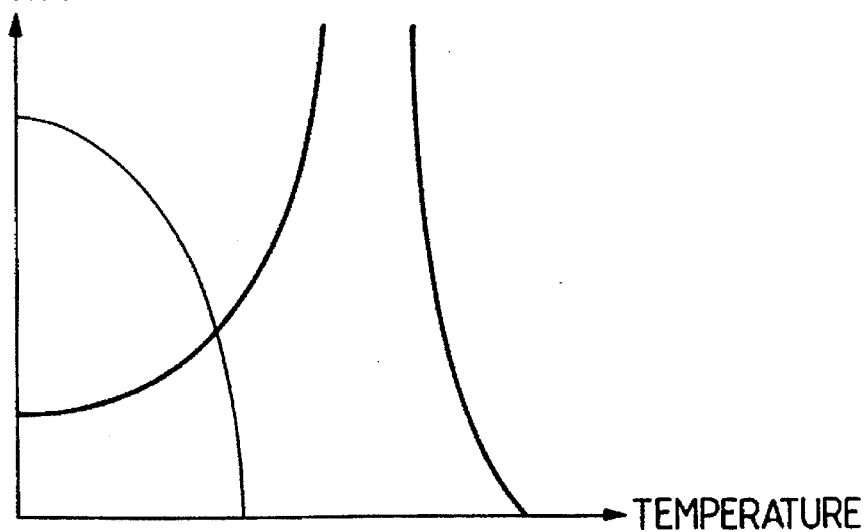
Figure 11C:
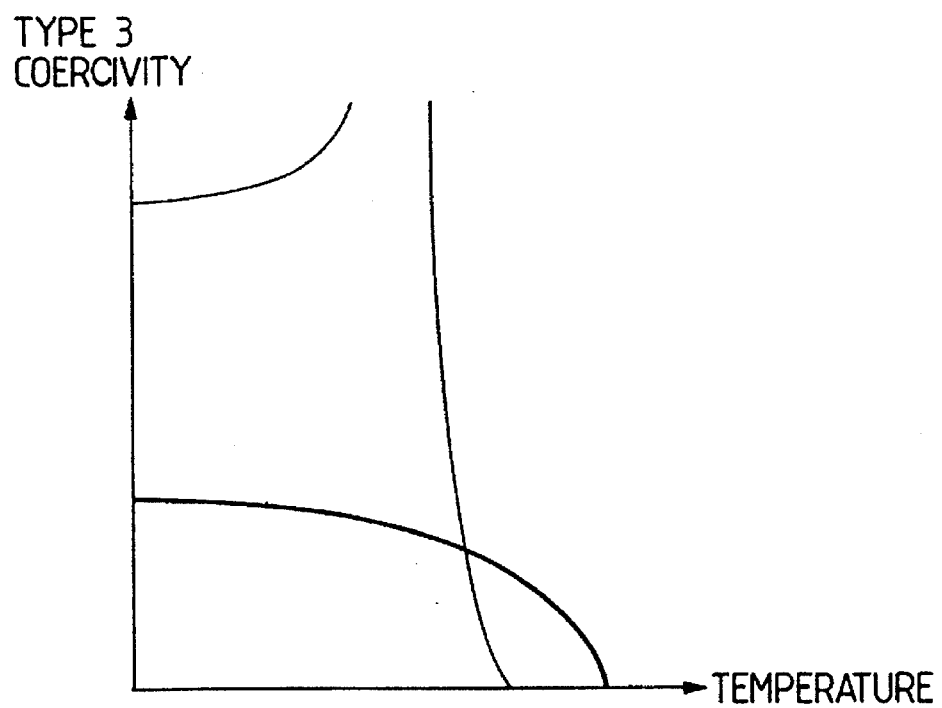
Figure 11D:
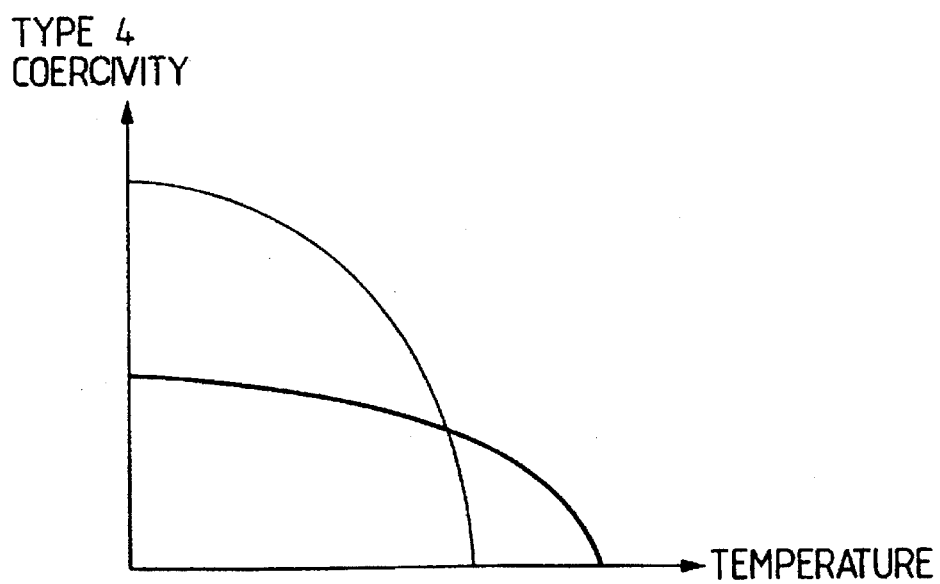
Figure 12:
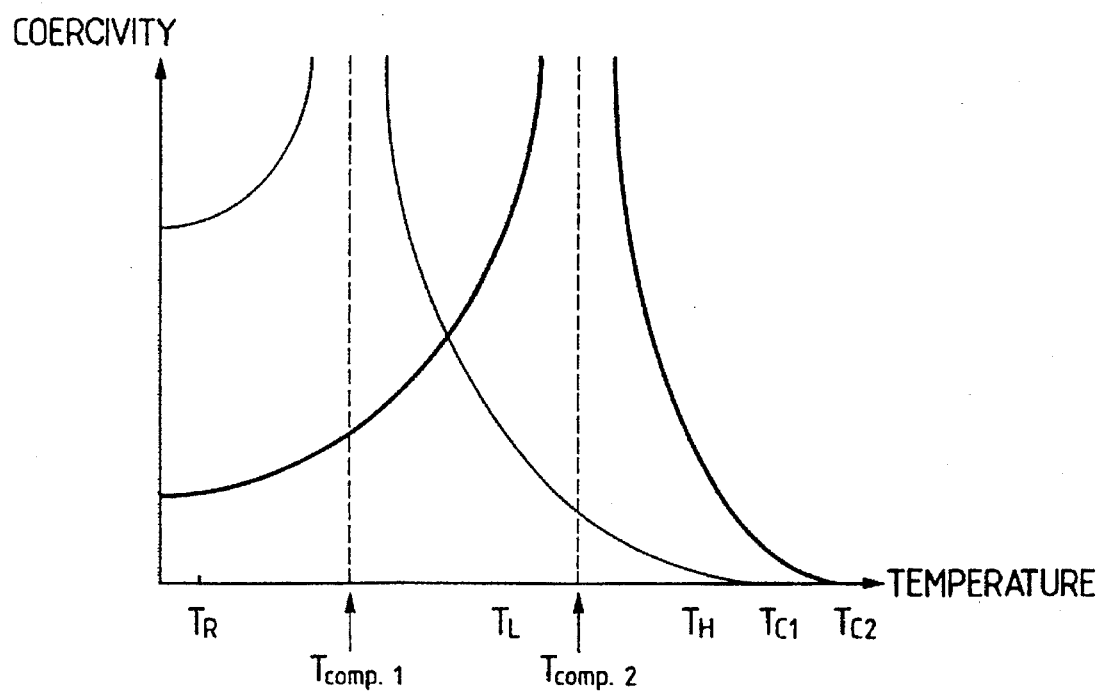
FIG. 12 is a graph showing the relationship between coercivity and the temperature for a medium No. 1.

The graph of FIG. 12 shows this relation. Note that thin curves indicate the first layer, and bold curves indicate the second layer. Those identifications are the same in the following graphs.

A condition that reverses the direction of magnetization of the second layer without reversing that of the first layer by the initial field (Hini.) at the room temperature $T_R$ is represented by Formula 12. The medium No. 1 satisfies Formula 12 at the $T_R$:

$$H_{C1} > H_{C2} + (\sigma_w/2M_{S1}t_1) + (\sigma_w/2M_{S2}t_2) \quad \text{Formula 12}$$

where $H_{C1}$: coercivity of first layer $H_{C2}$: coercivity of second layer $M_{S1}$: saturation magnetization of first layer $M_{S2}$: saturation magnetization of second layer $t_1$: film thickness of first layer $t_2$: film thickness of second layer $\sigma_w$: interface wall energy (Exchange coupling force).

At this time, a condition for the Hini. is represented by Formula 15. If the Hini. disappears, reversed magnetization of the first and second layers are influenced by each other due to the interface wall energy. The condition that can hold the direction of magnetization of the second layer is represented by Formulas 13 and 14. The medium No. 1 satisfies Formulas 13 and 14.

$$H_{C1} > (\sigma_w/2M_{S1}t_1) \quad \text{Formula 13}$$

$$H_{C2} > (\sigma_w/2M_{S2}t_2) \quad \text{Formula 14}$$

$$H_{C2} + (\sigma_w/2M_{S2}t_2) < |\text{Hini.}| < H_{C1} - (\sigma_w/2M_{S1}t_1) \quad \text{Formula 15}$$

The layer 2's magnetization of the recording medium which can satisfy Formulas 12 to 14 at the $T_R$ is aligned along the "A direction" (model 1, in FIG. 9B) by the Hini. which satisfies Formula 15. At this time, the recording layer 1 is maintained in the recorded state (Condition 1a or 1b in FIGS. 13 and 14).

Condition 1a or 1b is held to a point immediately before the recording. In this case, the bias field (Hb) is applied in the upward direction.

Note that it is difficult to focus the bias field Hb to the same range as the radiation region (spot region) of a laser beam like normal magnetic fields. When the medium is a disk-like medium, recorded information (bit) is influenced by Hini. during one revolution and is again set in Condition 1a or 1b. The bit passes a portion near a laser beam radiation region (spot region). The bit in Condition 1a or 1b is influenced by the bias field Hb since it approaches the bias field Hb applying means. In this case, if the direction of magnetization of the first layer of the bit in Condition 1a having a magnetization opposite to the direction of Hb is reversed by Hb, information which has been recorded one revolution before is erased. Formula 15-2 defining a condition for preventing such erasure is given by:

$$H_{C1} > Hb + \frac{\sigma_w}{2 M_{S1} t_1} \quad (15\text{-}2)$$

This formula must be satisfied at room temperature. In other words, one condition for determining Hb is given by Formula 15-2.

The bit in Condition 1a or 1b then reaches the laser beam spot region. The laser beam intensity includes two levels, i.e., low level and high level as in the prior applications.

Low-Temperature Cycle

A low-level laser beam is radiated, and a medium temperature is increased to be higher than $T_{comp.1}$. Thus, the medium type shifts from P type to A type. Although the directions of RE and TM spins of the first layer are left unchanged, the relationship between their intensities is reversed. As a result, the direction of magnetization of the first layer is reversed (Condition 1a→Condition 2La, Condition 1b→Condition 2Lb in FIG. 14).

The laser beam radiation continues and the medium temperature then reaches $T_L$. The following relationship is established:

$$H_{C1} + Hb < \frac{\sigma_w}{2 M_{S1} t_1}.$$

Even if Hb is present, Condition 2La changes to Condition 3L. Condition 2Lb is left unchanged even if Hb is present, and it becomes Condition 3L.

In this state, when an irradiated portion falls outside the laser beam spot region, the medium temperature begins to decrease. When the medium temperature is decreased below $T_{comp.1}$, the medium type returns from A type to original P type. The relationship between RE and TM spins of the first layer is reversed (from model 2 to model 1 in FIG. 9B). As a result, the magnetization of the first layer is aligned in the "A direction" (Condition 4L).

Condition 4L is maintained after the medium temperature is decreased to room temperature.

As a result, an "A-directed" bit is formed in the first layer.

The high-temperature cycle will now be described with reference to FIG. 13.

High-Temperature Cycle

When the medium temperature is increased to $T_L$ via Tcomp. 1 upon irradiation of the high-level laser beam, Condition 1a or 1b changes into Condition $2_H$.

When the laser-beam radiation further continues, the temperature of the medium increases accordingly. When the temperature of the medium slightly exceeds the temperature Tcomp. 2 of the second layer, the medium changes from A type to P type and the relationship between the strengths of the vectors is reversed (from the model 1 to the model 2) although the directions of the RE and TM spins remain the same. For this reason, the direction of magnetization of the second layer is reversed to be along the "non-A direction" (Condition $3_H$).

However, since the coercivity $H_{C2}$ is still high at this temperature, the direction of magnetization of the second layer will not be reversed by the field Hb. When the temperature further increases and reaches the temperature $T_H$, the temperature of the first and second layers substantially corresponds to the Curie temperatures and magnetization of the first and second layers disappears.

As a result, the medium satisfies one of the following Formulas (1) to (3):

$$|H_{C1} - H_{C2}| < \frac{\sigma_w}{2 M_{S1} t_1} + \frac{\sigma_w}{2 M_{S2} t_2} \quad (1)$$

-continued
and $$Hb > \frac{M_{S1} t_1 H_{C1} + M_{S2} + M_{S2} t_2 H_{C2}}{M_{S1} t_1 + M_{S2} t_2}$$

$$Hb > H_{C1} + \frac{\sigma_w}{2 M_{S1} t_1} \tag{2}$$

and $$Hb > H_{C2} - \frac{\sigma_w}{2 M_{S2} t_2}$$

$$Hb > H_{C1} - \frac{\sigma_w}{2 M_{S1} t_1} \tag{3}$$

and $$Hb > H_{C2} + \frac{\sigma_w}{2 M_{S2} t_2}.$$

For this reason, the directions of magnetization of both the layers are reversed at almost the same time, and obey the direction of Hb. This state is Condition 4H.

In Condition $4_H$, when an irradiated portion is separated from the laser beam spot, the temperature of the medium begins to decrease. When the temperature of the medium decreases below the temperature Tcomp. 2, the medium changes from P type to A type and the relationship between the strengths of the vectors is reversed from the model 3 to the model 4. As a result, the direction of magnetization of the second layer is reversed from the "A direction" to the "non-A direction" (Condition $5_H$).

When the temperature of the medium further decreases below Tcomp. 1, the medium returns from A type to P type and the relationship between the strengths of the vectors is reversed from the model 3 to the model 4. As the result, the direction of magnetization of the first layer is reversed from the "A direction" to the "non-A direction" (Condition $6_H$).

Then, the temperature of the medium decreases from the temperature in condition $6_H$ to the room temperature. Since the coercivity $H_{C1}$ at the room temperature is sufficiently high (referring to Formula 15-3), Condition $6_H$ is maintained without reversing the direction of magnetization of the first layer by the field Hb. In this way, bit formation in the "non-A-direction" is completed.

$$Hb < H_{C1} + \frac{\sigma_w}{2 M_{S1} t_1} \tag{15-3}$$

The principle of the method of the present invention will be described in detail using a specific medium No. 4 belonging to Class 4 (P type, Quadrant I, Type 4) shown in Table 1.

The medium No. 4 satisfies Formula 26:

$$T_R < T_L < T_H \leq T_{C1} \leq T_{C2} \tag{26}.$$

Figure 15:
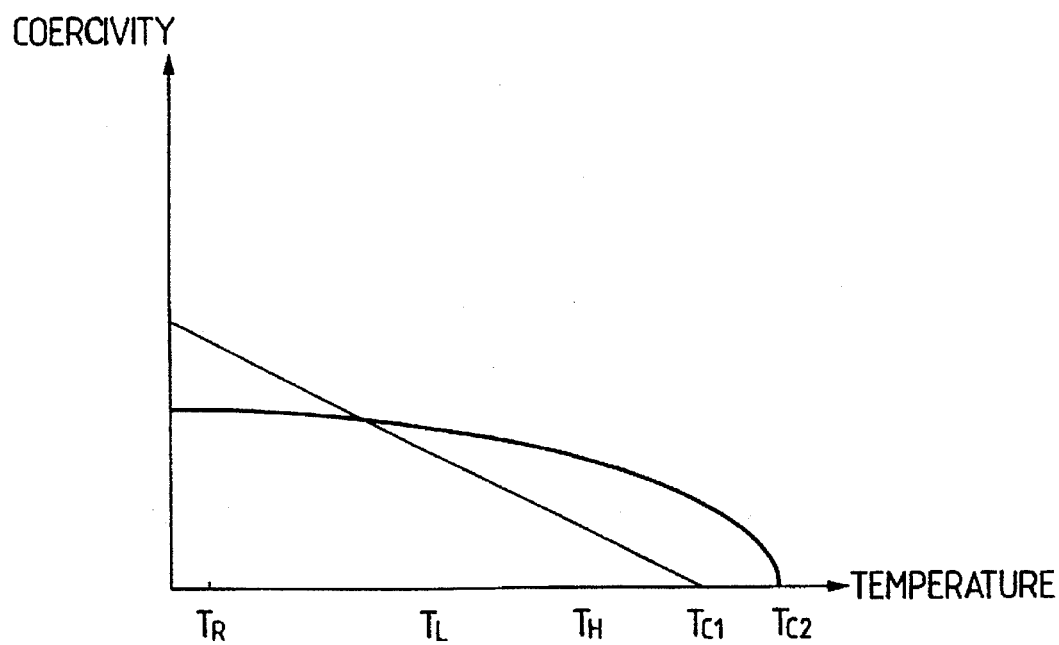
FIG. 15 is a graph showing the relationship between coercivity and the temperature for a medium No. 4.

For the sake of simplicity, the following description will be given for $T_H < T_{C1} < T_{C2}$. The graph of FIG. 15 shows this relation.

A condition that reverses the direction of magnetization of the reference layer 2 without reversing that of the recording layer 1 by the initial field (Hini.) at the room temperature $T_R$ is represented by Formula 27. The medium No. 4 satisfies Formula 27 at the $T_R$:

$$H_{C1} > H_{C2} + (\sigma_w/2M_{S1}t_1) + (\sigma_w/2M_{S2}t_2) \tag{27}.$$

At this time, a condition for the Hini. is represented by Formula 30-1. If the Hini. disappears, reversed magnetization of the layers 1 and 2 is influenced by the interface wall energy. The condition that can hold the direction of magnetization of the layer 2 is represented by Formulas 28 and 29. The medium No. 4 satisfies Formulas 28 and 29.

$$H_{C1} > (\sigma_w/2M_{S1}t_1) \tag{28}$$

$$H_{C2} > (\sigma_w/2M_{S2}t_2) \tag{29}$$

$$H_{C2} + (\sigma_w/2M_{S2}t_2) < |Hini.| < H_{C1} - (\sigma_w/2M_{S1}t_1) \tag{30-1}$$

The layer 2's magnetization which can satisfy Formulas 27 to 29 at the $T_R$ is aligned along the "A direction" by the Hini. which satisfies Formula 30-1. At this time, the recording layer 1 is maintained in the recorded state (Condition 1a or 1b in FIGS. 16 and 17).

Condition 1a or 1b is held to a point immediately before the recording.

When the medium is a disk-like medium, a condition that can prevent a recorded bit (in particular, a bit in Condition 1b in which the direction of magnetization of the first layer is opposite to that of Hb) from being reversed when it approaches the Hb applying means is given by Formula 30-2:

$$Hb < H_{C1} + \frac{\sigma_w}{2 M_{S1} t_1}. \tag{30-2}$$

The disk medium must satisfy this formula at room temperature. A condition that prevents the initialized second layer from being reversed when it approaches the Hb applying means is given by Formula 30-3:

$$Hb < H_{C2} - \frac{\sigma_w}{2 M_{S2} t_2}. \tag{30-3}$$

In other words, one of conditions for determining Hb is given by Formulas 30-2 and 30-3.

Low-Temperature Cycle

A low-level laser beam is radiated, and the medium temperature is increased to $T_L$. Then, the following relationship is established:

$$H_{C1} + Hb < \frac{\sigma_w}{2 M_{S1} t_1}.$$

Condition 1a changes to Condition 2L. On the other hand, since Condition 1b is maintained, it becomes the same Condition 2L (see FIG. 17).

In Condition 2L, when an irradiated portion falls outside the laser beam spot region, the medium temperature begins to drop.

Even when the medium temperature is decreased to room temperature, Condition 2L is maintained since $H_{C1}$ at room temperature is sufficiently large (Formula 30-4):

$$Hb < H_{C1} + \frac{\sigma_w}{2 M_{S1} t_1}. \tag{30-4}$$

As a result, an "A-directed" bit is formed in the first layer.

The high-temperature cycle will now be described with reference to FIG. 16.

High-Temperature Cycle

When the medium temperature is increased to $T_L$, upon irradiation of the high-level laser beam, Conditions 1a or 1b changes into or becomes Condition $2_H$.

When the laser-beam radiation further continues and the medium temperature is equal to the temperature $T_H$, since the temperature $T_H$ reaches near Curie temperature of the first and second layer the coercivities of the both layers 1 and 2 are decreased. As a result, the directions of magnetization of both the layers are reversed as has been described in Condition $3_H$ of the medium No. 1 (Condition $3_H$)

In Condition $3_H$, when an irradiation portion is separated from the laser beam spot, the temperature of the medium begins to decrease.

Then, the temperature of the medium decreases until the room temperature. However, Condition $3_H$ is maintained. In this way, bit formation in the "non-A direction" is completed.

The principle of the method of the present invention will be described in detail using a specific medium No. 5 belonging to Class 5 (A type, Quadrant II, type 3) shown in Table 1.

The medium No. 5 satisfies Formula 31:

$$T_R < \text{Tcomp.1} < T_L < T_H \leq T_{C1} \leq T_{C2} \tag{31}$$

For the sake of simplicity, the following description will be given for $T_H < T_{C1} < T_{C2}$. The graph of FIG. 18 shows this relation.

A condition that reverses the direction of magnetization of the reference layer 2 without reversing that of the recording layer 1 by the initial field (Hini.) at the room temperature $T_R$ is represented by Formula 32. The medium No. 5 satisfies Formula 32 at the $T_R$:

$$H_{C1} > H_{C2} + (\sigma_w/2M_{S1}t_1) - (\sigma_w/2M_{S2}t_2) \tag{32}$$

At this time, a condition for the Hini. is represented by Formula 35. If the Hini. disappears, reversed magnetization of the layers 1 and 2 is influenced by the interface wall energy. The condition that can hold the direction of magnetization of the layer 2 is represented by Formulas 33 and 34. The medium No. 5-2 satisfies Formulas 33 and 34.

$$H_{C1} > (\sigma_w/2M_{S1}t_1) \tag{33}$$

$$H_{C2} > (\sigma_w/2M_{S2}t_2) \tag{34}$$

$$H_{C2} + (\sigma_w/2M_{S2}t_2) < |\text{Hini.}| < H_{C1} + (\sigma_w/2M_{S1}t_1) \tag{35}$$

The layer 2's magnetization which can satisfy Formulas 32 to 34 at the $T_R$ is aligned along the "A direction" by the Hini. which satisfies Formula 35. At this time, the recording layer 1 is maintained in the recorded state (Condition 1a or 1b in FIGS. 19 and 20).

Condition 1 is held to a point immediately before the recording. In this case, the bias field (Hb) is applied in the downward direction.

When the medium is a disk-like medium, a condition that can prevent a recorded bit (in particular, a bit in Condition 1a in which the direction of magnetization of the first layer is opposite to that of Hb) from being reversed when it approaches the Hb applying means is given by Formula 35-2:

$$Hb < H_{C1} - \frac{\sigma_w}{2M_{S1}t_1} \tag{35-2}$$

The disk medium must satisfy this formula at room temperature. A condition that prevents the initialized second layer from being reversed when it approaches the Hb applying means is given by Formula 35-3:

$$Hb < H_{C2} - \frac{\sigma_w}{2M_{S2}t_2} \tag{35-3}$$

In other words, one of conditions for determining Hb is given by Formulas 35-2 and 35-3.

Figure 20:
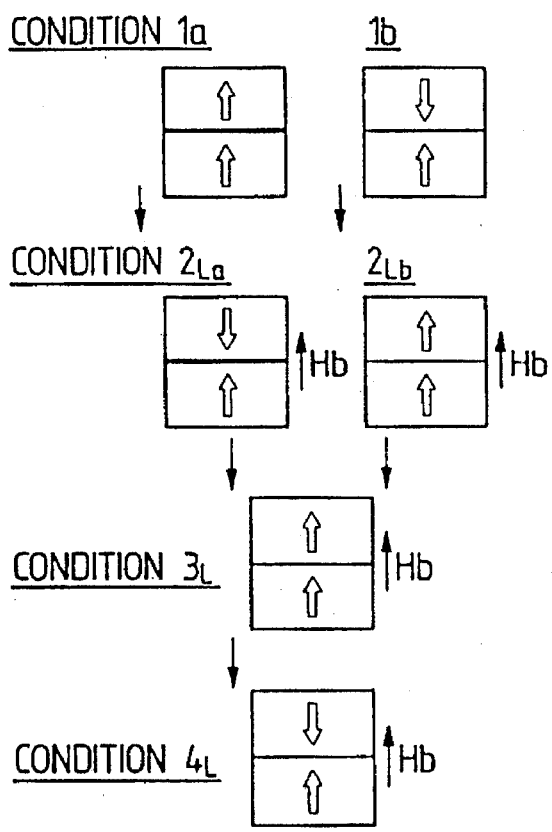

The low-temperature cycle will be described with reference to FIG. 20.

Low-Temperature Cycle

In Condition 1a or 1b immediately before recording, the medium temperature increases and exceeds Tcomp. 1 upon irradiation of the low-level laser beam. The relationship between the strength of the vectors in reversed although the directions of the RE and TM spins of the first layer remain the same. As a result the magnetization of the first layer is reversed (Condition 1a→Condition 2La, Condition 1b→Condition 2Lb). In this Condition the P type medium is temporarily formed.

When the medium temperature is further increased from this state and reaches $T_L$, the following relationship is established:

$$H_{C1} + Hb < \frac{\sigma_w}{2M_{S1}t_1}$$

Condition 2La changes to Condition 3L. On the other hand, since Condition 2Lb is maintained, it becomes the same Condition 3L.

In Condition 3L, when an irradiated portion is separated from the laser beam spot, the medium temperature begins to fall. When the medium temperature is below the temperature Tcomp. 1, the relationship between the strengths of the vectors of the RE and TM spins of the first layer is reversed (from the model 3 to the model 4, in FIG. 9B).

As a result, magnetization of the first layer is the "non-A direction" (Condition 4L). In this condition, the medium returns to A type.

Condition 4L is maintained even if the medium temperature is decreased to the room temperature. In this way, bit formation in the "non-A direction" is completed.

Figure 19:
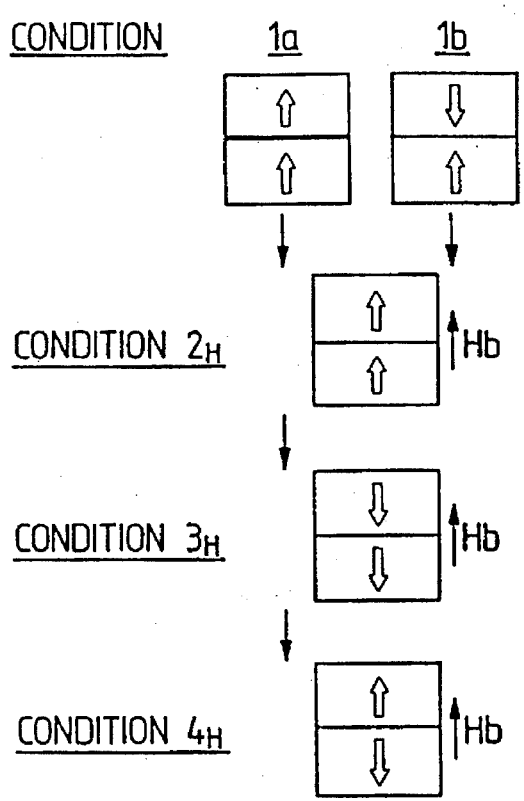
FIGS. 19 and 20 are diagrams showing the changes in the direction of magnetization in high- and low-temperature cycles of a medium No. 5.

The high-temperature cycle will now be described with reference to FIG. 19.

High-Temperature Cycle

When the medium temperature is increased to $T_L$ upon irradiaton of the high-level laser beam, Condition $2_H$ appears.

When the laser-beam radiation further continues and the medium temperature is equal to the temperature $T_H$, since the temperature $T_H$ of the layer 2 is near the Curie temperatures $T_{C1}$ and $T_{C2}$, coercivities of both the layers 1 and 2 are decreased. As a result, the directions of magnetization of both the layers are reversed as has been described in Condition $3_H$ of the medium No. 1.(Condition $3_H$).

In Condition $3_H$, when an irradiated portion is separated from the laser beam spot, the temperature of the medium begins to decrease.

When the medium temperature is decreaed below the temperature Tcomp. 1, the medium returns to A type from P type and the relationship between the strengths of the TM and RE spins of the layer 1 is reversed. For this reason, magnetization of the layer 1 is reversed to the "A-direction" (Condition $4_H$).

Then, the temperature of the medium decreases from the temperature in Condition $4_H$ to the room temperature. Since the coercivity $H_{c1}$ at the room temperature is sufficiently high, magnetization of the layer 1 is stably maintained. In this way, bit formation in the "A direction" is completed.

The principle of the method of the present invention will be described in detail using a specific medium No. 7-2 belonging to Class 7 (P type, Quadrant III, Type 4) shown in Table 1.

The medium 7 satisfies Formula 41:

$$T_R < T_L < T_H \leq T_{C1} \leq T_{C2} \tag{41}$$

For the sake of simplicity, the following description will be given for $T_H < T_{C1} < T_{C2}$. The graph of FIG. 21 shows this relation.

A condition that reverses the direction of magnetization of the reference layer 2 without reversing that of the recording layer 1 by the initial field (Hini.) at the room temperature $T_R$ is represented by Formula 42. The medium No. 7 satisfies Formula 42 at the $T_R$:

$$H_{C1} > H_{C2} + (\sigma_w/2M_{S1}t_1) + (\sigma_w/2M_{S2}t_2) \tag{42}$$

At this time, a condition for the Hini. is represented by Formula 45. If the Hini. disappears, reversed magnetization of the reference layer 2 is influenced by magnetiation of the recording layer 1 due to an exchange coupling force. The condition that can hold the direction of magnetization of the layer 2 is represented by Formulas 43 and 44. The medium No. 7 satisfies Formulas 43 and 44.

$$H_{C1} > (\sigma_w/2M_{S1}t_1) \tag{43}$$

$$H_{C2} > (\sigma_w/2M_{S2}t_2) \tag{44}$$

$$H_{C2} + (\sigma_w/2M_{S2}t_2) < |\text{Hini.}| < H_{C1} - (\sigma_w/2M_{S1}t_1) \tag{45}$$

The layer 2's magnetization which can satisfy Formulas 42 to 44 at the $T_R$ is aligned along the "A direction" by the Hini. which satisfies Formula 45. At this time, the recording layer 1 is maintained in the recorded state (Condition 1a or 1b in FIGS. 22 and 23).

Condition 1a or 1b is held to a point immediately before the recording. In this case, the bias field (Hb) is applied in the downward direction.

Note that in this medium No. 7, conditions represented by the above Formulas 30-2 and 30-3 apply.

The high-temperature cycle will now be described with reference to FIG. 22.

High-Temperature Cycle

In Condition 1a or 1b, when the medium temperature is increased to $T_L$ upon irradiation of the high-level laser beam, Condition $2_H$ appears.

When the laser-beam radiation continues and the medium temperature is equal to the temperature $T_H$, since the temperature $T_H$ is near the Curie temperatures $T_{C1}$ and $T_{C2}$, the medium satisfies one of formulas (1)–(3), shown for the medium No. 1. This state is Condition $3_H$.

In Condition $3_H$, when an irradiated portion is separated from the laser beam spot, the temperature of the medium begins to decrease.

Then, the temperature of the medium decreases from the temperature in Condition $3_H$ to the room temperature. Since the coercivity $H_{C1}$ at the room temperature is sufficiently high, magnetization of the layer 1 is stably maintained. In this way, bit formation in the "non-A direction" is completed.

The low-temperature cycle is shown in FIG. 23.

Since this cycle is the same as that in the medium No. 4, a description thereof will be omitted.

The principle of the method of the present invention will be described in detail using a specific medium No. 8 belonging to Class 8 (A type, Quadrant IV, Type 2) shown in Table 1.

The medium No. 8 satisfies Formula 46:

$$T_R < T_L < T_H \leq T_{C1} \leq T_{C2} \tag{46}$$

The following description will be given for $$T_H < T_{C1} < T_{C2} \text{ and } T_L < T_{C1} < T_{comp.2}.$$

Figure 24:
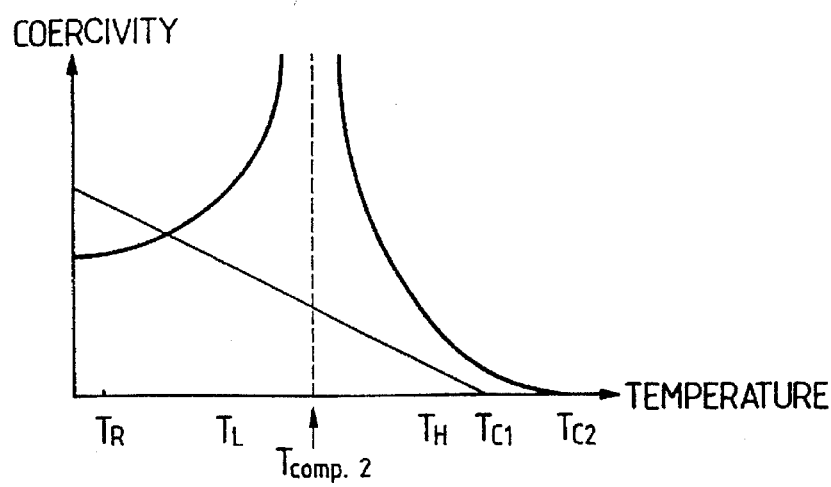
FIG. 24 is a graph showing the relationship between coercivity and the temperature for a medium No. 8.

The graph of FIG. 24 shows this relation.

A condition that reverses the direction of magnetization of the reference layer 2 without reversing that of the recording layer 1 by the initial field (Hini.) at the room temperature $T_R$ is represented by Formula 47. The medium No. 8 satisfies Formula 47 at the $T_R$:

$$HC_1 > H_{C2} + |(\sigma_w/2M_{S1}t_1) - (\sigma_w/2M_{S2}t_2)| \tag{47}$$

At this time, a condition for the Hini. is represented by Formula 50. If the Hini. disappears, reversed magnetization of the reference layer 2 is influenced by magnetization of the recording layer 1 due to the interface wall energy. The condition that can hold the direction of magnetization of the layer 2 is represented by Formulas 48 and 49. The medium No. 8 satisfies Formulas 48 and 49.

$$H_{C1} > (\sigma_w/2M_{S1}t_1) \tag{48}$$

$$H_{C2} > (\sigma_w/2M_{S2}t_2) \tag{49}$$

$$H_{C2} + (\sigma_w/2M_{S2}t_2) < |\text{Hini.}| < H_{C1} + (\sigma_w/2M_{S1}t_1) \tag{50}$$

The layer 2's magnetization which can satisfy Formulas 47 to 49 at the $T_R$ is aligned along the "A direction" by the Hini., which satisfies Formula 50. At this time the recording layer 1 is maintained in the recorded state (Condition 1a or 1b in FIGS. 25 and 26).

Condition 1 is held to a point immediately before the recording. In this case, the bias field (Hb) is applied in the upward direction.

When the medium is a disk-like medium, a condition that can prevent a recorded bit (in particular, a bit in Condition 1b in which the direction of magnetization of the first layer is opposite to that of Hb) from being reversed when it approaches the Hb applying means is given by Formula 50-2:

$$Hb < H_{C1} - \frac{\sigma_w}{2M_{S1}t_1}. \tag{50-2}$$

The disk medium must satisfy this formula at room temperature. In other words, one of the conditions for determining Hb is given by Formula 50-2.

A bit in Condition 1a or 1b then reaches the laser beam spot region.

Figures 25, 26:
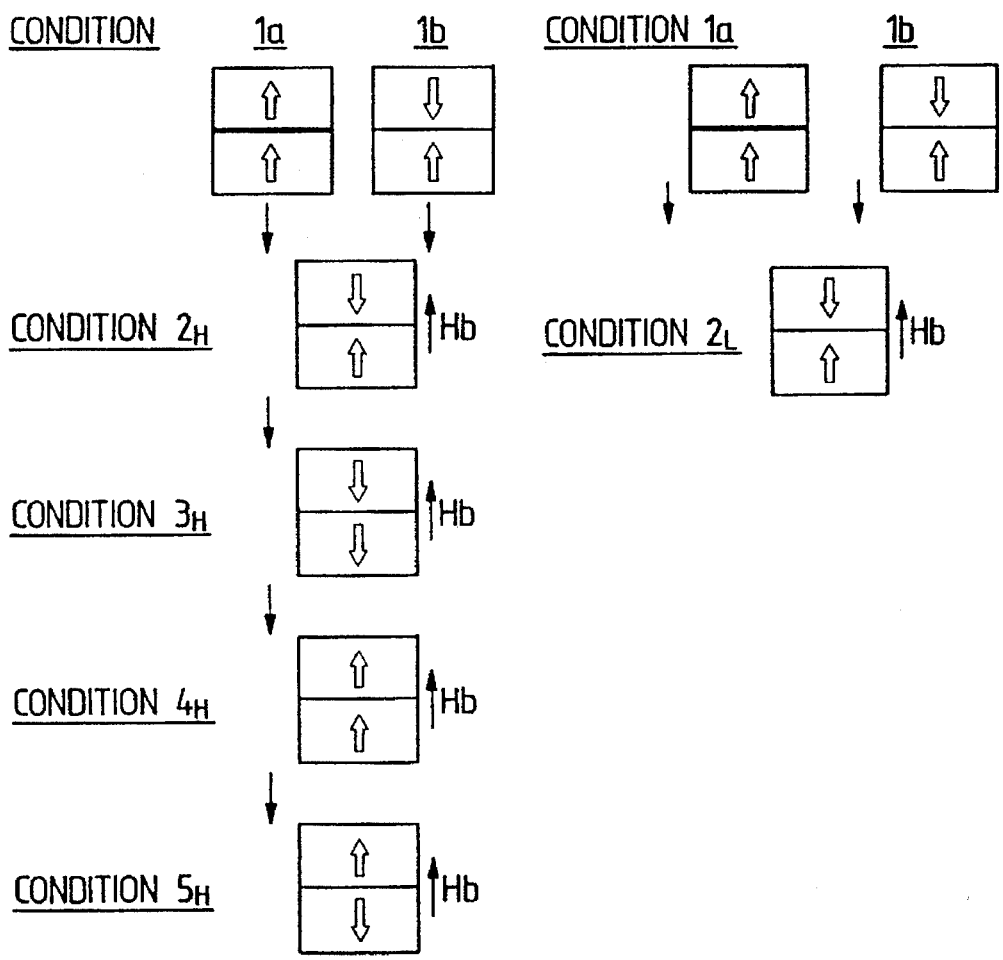
FIGS. 25 and 26 are diagrams showing the changes in the direction of magnetization in high- and low-temperature cycles of a medium No. 8.

The low-temperature cycle will now be described with reference to FIG. 26.

Low-Temperature Cycle

A low-level laser beam is radiated, and the medium temperature is increased to $T_L$. Then, the following formula is satisfied:

$$H_{C1} + Hb < \frac{\sigma_w}{2 M_{S1} t_1}.$$

Condition 1a changes to Condition 2L. On the other hand, since Condition 1b is maintained, it also becomes the Condition 2L.

In Condition 2L, when an irradiated portion falls outside the laser beam spot region, the medium temperature begins to drop. Even when the medium temperature is decreased to room temperature, Condition 2L is maintained since $H_{C1}$ at room temperature is sufficiently large (Formula 50-2).

As a result, a "non-A-directed" bit is formed in the first layer.

The high-temperature cycle will now be described with reference to FIG. 25.

High-Temperature Cycle

In Condition 1a or 1b when the medium temperature is increased to $T_L$ upon irradiation of the high-level laser beam, Condition $2_H$ appears.

When the laser-beam radiation continues and the medium temperature is slightly higher than the temperature Tcomp. 2, the medium changes from A type into P type and the relationship between the strengths of the RE and TM spins is reversed although the directions thereof remain the same. As a result, the direction of the magnetization of the layer 2 is reversed to "non-A direction". This state is Condition $3_H$.

At this temperature, however, since the coercivity $H_{C2}$ is yet high, magnetization of the layer 2 will not be reversed by the bias field Hb. The laser-beam radiation further continues and the medium temperature is increased to $T_H$. Since the temperature $T_H$ is near the temperatures $T_{C1}$ and $T_{C2}$, coercivities of both layers 1 and 2 decrease and the medium satisfies one of formulas (1)–(3). This state is Condition $4_H$.

In Condition $4_H$, when an irradiated portion is separated from the laser beam spot, the temperature of the medium begins to decrease and the medium returns to A type from P type.

At this time the relationship between the strength of the RE and TM spins is reversed without reversing the directions thereof. As a result, the direction of magnetization of the layer 2 is reversed to "non-A direction". In this state, since the coercivity $H_{C2}$ is already sufficiently high, magnetization of the layer 2 will not be reversed by the bias field Hb. This state is Condition $5_H$.

Then, the temperature of the medium decreases from the temperature in Condition $5_H$ to the room temperature. Since the coercivity $H_{C1}$ at the room temperature is sufficiently high, magnetization of the layer 1 is stably maintained. In this way, bit formation in the "A direction" is completed The present invention will be described in more detail below by way of its examples and comparative examples. However, the present invention is not limited to these examples.

EXAMPLE 1

Figure 27:
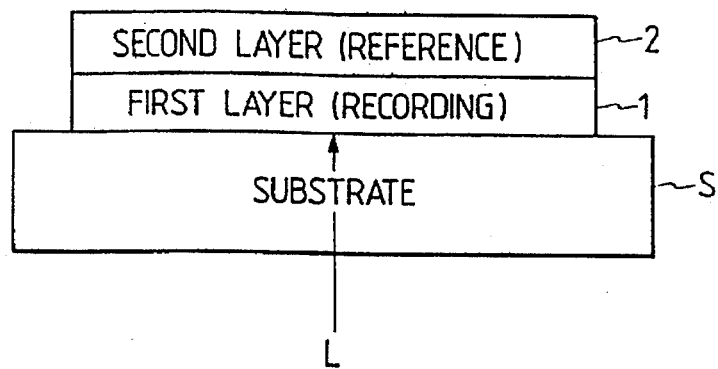
FIG. 27 is a diagram of a multilayered structure of a recording medium according to an embodiment of the present invention.

A 3-source RF magnetron sputtering apparatus was used, and a disk-like glass substrate S having a thickness of 1.2 mm and a diameter of 130 mm shown in FIG. 27 was set in a vacuum chamber of the apparatus.

After the interior of the vacuum chamber was evacuated to $2 \times 10^{-7}$ Torr, argon gas was introduced, and sputtering was performed at a film formation rate of about 5 Å/sec while maintaining the Ar gas pressure at $3 \times 10^{-3}$ Torr.

As a first target, a TbFeCo alloy was used, and a first layer (recording layer) 1 consisting of a $Tb_{21}Fe_{70}Co_9$ perpendicular magnetic anisotropy film having a film thickness $t_1$=600 Å was formed on the substrate. Note that the unit of suffixes in the alloy composition is atomic %. This also applies to the following description.

Subsequently, simultaneous sputtering was performed using Dy and an FeCo alloy as targets while maintaining the vacuum state. Thus, a second layer (reference layer) 2 consisting of a $Dy_{27}(Fe_{70}Co_{30})_{73}$ perpendicular magnetic anisotropy film having a film thickness $t_2$=1,200 Å was formed on the first layer.

Table 2 below summarizes magnetic characteristics (25° C.) of a two-layered magnetooptical recording medium thus manufactured and belonging to Class 8 (A type, Quadrant IV, Type 2).

TABLE 2

|  | First Layer | Second Layer |
| --- | --- | --- |
| Composition | $Tb_{21}Fe_{70}Co_9$ | $Dy_{27}(Fe_{70}Co_{30})_{73}$ |
| Film Thickness (Å) | 600 | 1200 |
| Ms (emu/cc) | 50 | 120 |
| Hc ($O_e$) | 10,000 | 1,500 |
| Tc (°C.) | 215 | 280 |
| Tcomp. (°C.) | None | 120 |
| $\sigma_w$ (erg/cm$^2$) | 4.0 | |

EXAMPLE 2

After a first layer consisting of a $Tb_{21}Fe_{70}Co_9$ perpendicular magnetic anisotropy film having a film thickness $t_1$=600 Å was formed following the same procedures as in Example 1, simultaneous sputtering was performed using a TbDy alloy and an FeCo alloy as targets while maintaining the vacuum state. Thus, a second layer consisting of a $(Tb_{40}Dy_{60})_{27}(Fe_{70}Co_{30})_{73}$ perpendicular magnetic anisotropy film having a film thickness $t_2$=900 Å was formed on the first layer.

Table 3 below summarizes magnetic characteristics (25° C.) of a two-layered magnetooptical recording medium thus manufactured and belonging to Class 8 (A type, Quadrant IV, Type 2).

TABLE 3

|  | First Layer | Second Layer |
| --- | --- | --- |
| Composition | *1 | *2 |
| Film Thickness (Å) | 600 | 900 |
| Ms (emu/cc) | 50 | 120 |
| Hc ($O_e$) | 10,000 | 2,500 |
| Tc (°C.) | 215 | 300 |
| Tcomp. (°C.) | None | 120 |
| $\sigma_w$ (erg/cm$^2$) | 5.3 | |

*1 $Tb_{21}Fe_{70}Co_9$
*2 $(Tb_{40}Dy_{60})_{27}(Fe_{70}Co_{30})_{73}$

Comparative Example 1

After a first layer consisting of a $Tb_{21}Fe_{70}Co_9$ perpendicular magnetic anisotropy film having a film thickness $t_1$=600 Å was formed following the same procedures as in Example 1, simultaneous sputtering was performed using two sources, i.e., a GdDy alloy and an $Fe_{70}Co_{30}$ alloy as targets while maintaining the vacuum state. Thus, a second layer consisting of a $(Gd_{50}Dy_{50})_{27}(Fe_{70}Co_{30})_{73}$ perpendicular magnetic anisotropy film having a film thickness $t_2=2,000$ Å was formed on the first layer.

Table 4 below summarizes magnetic characteristics (25° C.) of a two-layered magnetooptical recording medium thus manufactured and belonging to Class 8 (A type, Quadrant IV, Type 2).

TABLE 4

|  | First Layer | Second Layer |
|---|---|---|
| Composition | *1 | *2 |
| Film Thickness (Å) | 600 | 2000 |
| Ms (emu/cc) | 50 | 120 |
| Hc (O_e) | 10,000 | 1,000 |
| Tc (°C.) | 215 | 350 |
| Tcomp. (°C.) | None | 120 |
| σ_w (erg/cm²) | 4.0 | |

*1 $Tb_{21}Fe_{70}Co_9)_{79}$
*2 $(Gd_{50}Dy_{50})_{27}(Fe_{70}Co_{30})_{73}$

Comparative Example 2

After a first layer consisting of a $Tb_{21}Fe_{70}Co_9$ perpendicular magnetic film having a film thickness $t_1=600$ Å was formed following the same procedures as in Example 1, sputtering was performed using another target while maintaining the vacuum state. Thus, a second layer consisting of a $Tb_{26}Fe_{52}Co_{22}$ perpendicular magnetic anisotropy film having a film thickness $t_2=2,000$ Å was formed on the first layer.

Table 5 below summarizes magnetic characteristics (25° C.) of a two-layered magnetooptical recording medium thus manufactured and belonging to Class 8 (A type, Quadrant IV, Type 2).

TABLE 5

|  | First Layer | Second Layer |
|---|---|---|
| Composition | $Tb_{21}Fe_{70}Co_9$ | $Tb_{26}Fe_{52}Co_{22}$ |
| Film Thickness (Å) | 600 | 500 |
| Ms (emu/cc) | 65 | 150 |
| Hc (O_e) | 10,000 | 4,500 |
| Tc (°C.) | 215 | 270 |
| Tcomp. (°C.) | None | 150 |
| σ_w (erg/cm²) | 5.0 | |

Evaluation of Medium (1) Intensity of Minimum Hini:

A minimum value of Hini. necessary for an over-write operation will be examined below. In the case of the Class 8 medium, the intensity of Hini. is expressed by:

$$H_{C2} + \frac{\sigma_w}{2M_{S2}t_2} < |Hini.| < H_{C1} + \frac{\sigma_w}{2M_{S1}t_1}.$$

Thus, minimum Hini. (unit: Oe) of each of the media in the above examples and comparative examples is calculated. Table 8 shows the calculation results.

(2) Minimum Film Thickness $t_2$ of Second Layer:

When the second layer is initialized by Hini. at room temperature and the direction of magnetization is aligned in the "A direction" or "non-A direction", a condition for the Class 8 medium for maintaining this state even if the second layer is influenced by the magnetization of the first layer is expressed by:

$$H_{C2} > \frac{\sigma_w}{2M_{S2}t_2}.$$

After this formula is modified as follows, the minimum film thickness $t_2$ (unit: Å) necessary for the second layer of each of the media of the above examples and comparative examples is calculated. Table 8 also shows the calculation results.

$$t_2 > \frac{\sigma_w}{2M_{S2}H_{C2}}$$

(3) C/N Ratio:

Description of Over Write Capable Magnetooptical Recording Apparatus

Figure 28:
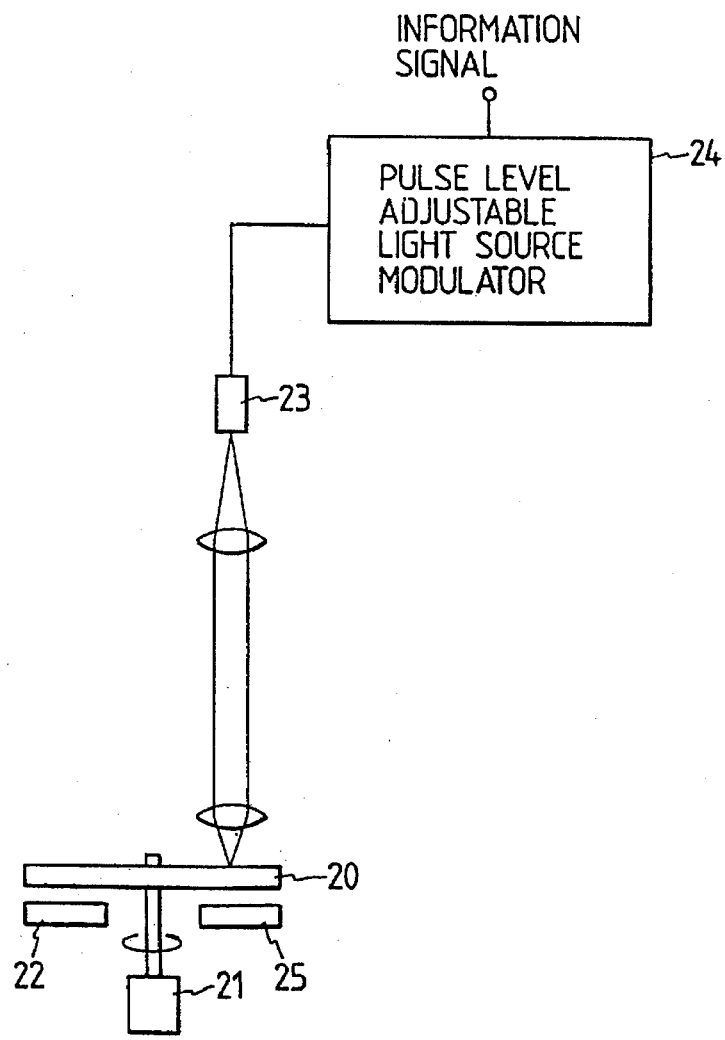
FIG. 28 is a diagram showing the overall arrangement of a magnetooptical recording apparatus.

This apparatus is exclusively used for recording, and its overall arrangement is shown in FIG. 28.

This apparatus basically comprises:

an electric motor 21 for rotating a recording medium 20;

a device 22 for applying an initial field Hini.;

a laser beam light source 23;

a modulator 24 for pulse-modulating a beam intensity in accordance with binary information to be recorded between (1) high level giving a medium temperature $T_H$ suitable for forming one of a bit having an upward magnetization and a bit having a downward magnetization and (2) low level giving a medium temperature $T_L$ suitable for forming the other bit; and a device 25 for applying a bias field Hb.

As the Hini. applying device 22, permanent magnets which generate an "A-directed" magnetic field and respectively have an intensity of:

Medium of Example 1: 4,000 Oe

Medium of Example 2: 5,500 Oe

Medium of Comparative Example 1: 4,000 Oe

Medium of Comparative Example 2: 9,000 Oe are used according to the types of medium. As the Hb applying device 25, a permanent magnet which has an intensity of 300 Oe and generates an "A-directed" magnetic field is used.

The permanent magnets 22 and 25 are rod-like, each having a length corresponding to the radius of the disk-like recording medium 20. The magnets 22 and 25 are fixed to the recording apparatus, and are not moved together with a pickup including the light source 23.

Measurement of C/N Ratio

Magnetooptical recording was carried out using the recording apparatus shown in FIG. 28. The medium 20 of one of the examples and comparative examples described above was rotated by the motor 21 at a linear velocity of 12 m/sec. A laser beam was radiated on the medium 20. The beam intensity can be adjusted by the modulator 24, and was set as shown in Table 6 according to the types of medium.

TABLE 6

| Medium | Beam Intensity (on disk) | |
|---|---|---|
| | Low Level | High Level |
| Example 1 | 6.2 mW | 13.5 mW |
| Example 2 | 4.8 mW | 11.5 mW |
| Comparative Example 1 | 8.0 mW | 18.0 mW |
| Comparative Example 2 | 3.8 mW | 9.0 mW |

The beam was pulse-modulated by the modulator 24 in accordance with information. In this case, information to be recorded is a signal at a frequency of 1 MHz. Therefore, the beam was radiated on the medium 20 while being modulated at that frequency. Thus, the 1-MHz signal must have been recorded.

When the recorded information was reproduced by a separate magnetooptical reproducing apparatus, its C/N ratio was:

60 dB . . . Examples 1 and 2

57 to 60 dB . . . Comparative Examples 1 and 2.

Thus, it was demonstrated that the information was recorded.

A 2-MHz signal was recorded on the already recorded region of the medium 20 as new information.

When this information was similarly reproduced, the new information was reproduced, and it was demonstrated that the over-write operation could be performed. The C/N ratio upon over-write operation was as shown in Table 8.

Under this condition, each medium reached the corresponding temperature shown in Table 7.

TABLE 7

| Medium | Medium Temperature | |
|---|---|---|
| | Low Level | High Level |
| Example 1 | $T_L$ 120° C. | $T_H$ 200° C. |
| Example 2 | $T_L$ 105° C. | $T_H$ 200° C. |
| Comparative Example 1 | $T_L$ 120° C. | $T_H$ 190° C. |
| Comparative Example 2 | $T_L$ 115° C. | $T_H$ 209° C. |

TABLE 8

(Hini. in Oe; Film Thickness in Å)

| | Minimum Hini. | Minimum Film Thickness $t_2$ | C/N ratio (dB) |
|---|---|---|---|
| Example 1 TbFeCo/DyFeCo | 2890 | 1111 | 58 |
| Example 2 TbFeCo/TbDyFeCo | 4954 | 883 | 59 |
| Comparative Example 1 TbFeCo/GdDyFeCo | 1833 | 1667 | 56 |
| Comparative Example 2 TbFeCo/TbFeCo | 7833 | 370 | 58 |

What is claimed is:

1. An over-writable method of magnetooptical recording, comprising:

providing an over-write capable magnetooptical disk recording medium having a substrate and a magnetic layer structure stacked on said substrate and including a first layer having perpendicular magnetic anisotropy and constituting a recording layer and a second layer having perpendicular magnetic anisotropy and constituting a reference layer, wherein said second layer comprises an alloy composition given by the formula:

$$(Tb_U Dy_{100-U})_V (Fe_{100-W} Co_W)_{100-V}$$

where U=0 to 50 atomic %

V=15 to 35 atomic % and

W=1 to 50 atomic % and said medium satisfies the following conditions at a room temperature:

$$H_{c1} > \frac{\sigma_w}{2M_{s1}t_1}$$

and $$H_{c2} > \frac{\sigma_w}{2M_{s2}t_2}$$

wherein $H_{C1}$: coercivity of first layer, $\sigma_w$: exchange coupling force, $M_{s1}$: saturation magnetization of first layer, $t_1$: film thickness of first layer, $H_{C2}$: coercivity of second layer, $M_{s2}$: saturation magnetization of second layer, and $t_2$: film thickness of second layer, said method further comprising the following steps:

providing magnetization of said second layer in a predetermined direction at a region thereof to be recorded;

rotating said medium; and irradiating said region with a laser beam pulse-modulated between a first intensity level and a second, higher, intensity level in accordance with binary information to be recorded, while applying a bias field to said region, wherein one of the following conditions is satisfied:

(i) $T_R < T_L < T_{C1} < T_H \leq T_{C2}$ (ii) $T_R < T_L < T_H \leq T_{C1} \leq T_{C2}$ where $T_R$: room temperature $T_{C1}$: Curie temperature of first layer $T_{C2}$: Curie temperature of second layer $T_L$: temperature of recording medium when first intensity level laser beam is radiated $T_H$: temperature of recording medium when second intensity level laser beam is radiated whereby bits are recorded in said first layer having either of two directions of magnetization dependent upon said first intensity level and said second intensity level, respectively.

2. A method according to claim 1, wherein the following condition is established at $T_L$:

$$H_{C1} + Hb < \frac{\sigma w}{2M_{S1}t_1}$$

wherein the following condition is satisfied at $T_R$:

$$Hb < H_{C2} - \frac{\sigma w}{2M_{S2}t_2}$$

and wherein one of the following conditions is satisfied at $T_R$:

$$Hb < H_{C2} + \frac{\sigma w}{2M_{S1}t_1}$$

-continued $$Hb < H_{C1} - \frac{\sigma w}{2M_{S1}t_1}$$

wherein Hb: bias field.

3. A method according to claim 1, wherein said second layer has a compensation temperature between a room temperature and Curie temperature of the second layer.

4. A method according to claim 2, wherein said second layer has a compensation temperature between a room temperature and Curie temperature of the second layer.

* * * * *